US010963987B2

(12) United States Patent
Lin et al.

(10) Patent No.: US 10,963,987 B2
(45) Date of Patent: *Mar. 30, 2021

(54) METHOD AND APPARATUS FOR DECODING PROJECTION BASED FRAME WITH 360-DEGREE CONTENT REPRESENTED BY TRIANGULAR PROJECTION FACES PACKED IN TRIANGLE-BASED PROJECTION LAYOUT

(71) Applicant: MEDIATEK INC., Hsin-Chu (TW)

(72) Inventors: Hung-Chih Lin, Hsin-Chu (TW);
Chao-Chih Huang, Hsinchu County (TW); Chia-Ying Li, Hsin-Chu (TW); Hui Ou Yang, Tainan (TW);
Jian-Liang Lin, Hsinchu (TW);
Shen-Kai Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,288

(22) Filed: Mar. 26, 2020

(65) Prior Publication Data
US 2020/0226711 A1 Jul. 16, 2020

Related U.S. Application Data

(63) Continuation of application No. 16/460,958, filed on Jul. 2, 2019, now Pat. No. 10,679,324, which is a
(Continued)

(51) Int. Cl.
*G06T 3/00* (2006.01)
*G06T 3/60* (2006.01)
(Continued)

(52) U.S. Cl.
CPC .......... *G06T 3/0062* (2013.01); *G02B 27/017* (2013.01); *G06T 1/0007* (2013.01);
(Continued)

(58) Field of Classification Search
CPC .................................................. G06T 3/0062
See application file for complete search history.

(56) References Cited

U.S. PATENT DOCUMENTS 6,141,034 A 10/2000 McCutchen
6,144,773 A 11/2000 Kolarov
(Continued)

FOREIGN PATENT DOCUMENTS

CN 1491403 A 4/2004
CN 101606177 A 12/2009
(Continued)

OTHER PUBLICATIONS

"International Search Report" dated Dec. 28, 2017 for International application No. PCT/CN2017/104849, International filing date:Sep. 30, 2017.

(Continued)

*Primary Examiner* — Paulos M Natnael
(74) *Attorney, Agent, or Firm* — Winston Hsu

(57) ABSTRACT

A video processing method includes receiving a bitstream, and decoding, by a video decoder, the bitstream to generate a decoded frame. The decoded frame is a projection-based frame that has a 360-degree image/video content represented by triangular projection faces packed in a triangle-based projection layout. An omnidirectional image/video content of a viewing sphere is mapped onto the triangular projection faces via a triangle-based projection of the viewing sphere. An equator of the viewing sphere is not mapped along any side of each of the triangular projection faces.

17 Claims, 11 Drawing Sheets

Related U.S. Application Data continuation of application No. 15/825,081, filed on Nov. 28, 2017, now Pat. No. 10,380,715.

(60) Provisional application No. 62/430,968, filed on Dec. 7, 2016.

(51) Int. Cl.
  *G06T 19/00* (2011.01)
  *G06T 1/00* (2006.01)
  *G02B 27/01* (2006.01)

(52) U.S. Cl.
  CPC .............. *G06T 19/006* (2013.01); *G06T 3/60* (2013.01); *G06T 2207/10016* (2013.01)

(56) References Cited

U.S. PATENT DOCUMENTS

| | | | |
|---|---|---|---|
| 6,466,254 | B1 | 10/2002 | Furlan |
| 9,235,108 | B2 | 1/2016 | Mima |
| 10,375,371 | B2 * | 8/2019 | Xu .................... H04N 19/86 |
| 10,380,715 | B2 | 8/2019 | Lin |
| 10,462,484 | B2 | 10/2019 | Lin |
| 10,771,791 | B2 * | 9/2020 | Lin ..................... H04N 19/174 |
| 2004/0105597 | A1 | 6/2004 | Lelescu |
| 2006/0251336 | A1 | 11/2006 | Lelescu |
| 2006/0257032 | A1 | 11/2006 | Nakagawa |
| 2009/0123088 | A1 | 5/2009 | Kallay |
| 2010/0001997 | A1 | 1/2010 | Kajikawa |
| 2010/0086023 | A1 | 4/2010 | Cheung |
| 2013/0050590 | A1 | 2/2013 | Nobutani |
| 2013/0185353 | A1 | 7/2013 | Rondao Alface |
| 2015/0341552 | A1 | 11/2015 | Chen |
| 2016/0071240 | A1 | 3/2016 | Liu |
| 2016/0142697 | A1 | 5/2016 | Budagavi |
| 2017/0155797 | A1 | 6/2017 | Otani |
| 2017/0358126 | A1 | 12/2017 | Lim |
| 2018/0075576 | A1 | 3/2018 | Liu |
| 2018/0158170 | A1 | 6/2018 | Lin |
| 2018/0225876 | A1 | 8/2018 | Lim |
| 2018/0262775 | A1 | 9/2018 | Lee |
| 2018/0332305 | A1 | 11/2018 | Lin |
| 2019/0026858 | A1 | 1/2019 | Lin |
| 2019/0325553 | A1 | 10/2019 | Lin |

FOREIGN PATENT DOCUMENTS

| | | |
|---|---|---|
| CN | 101853621 A | 10/2010 |
| CN | 102481487 A | 5/2012 |
| CN | 102938018 A | 2/2013 |
| CN | 105164998 A | 12/2015 |
| CN | 105898254 A | 8/2016 |
| CN | 105898339 A | 8/2016 |
| CN | 105898359 A | 8/2016 |
| EP | 3 446 282 A1 | 2/2019 |
| JP | 2016-42629 A | 3/2016 |
| TW | 201101077 A1 | 1/2011 |
| TW | 201633104 A | 9/2016 |
| WO | 2015/159789 A1 | 10/2015 |
| WO | 2016/140082 A1 | 9/2016 |

OTHER PUBLICATIONS

"International Search Report" dated Dec. 28, 2017 for International application No. PCT/CN2017/104745, International filing date:Sep. 30, 2017.

Zhang, Chunxiao et al., Intermediate Cubic-Panorama Synthesis Based on Triangular Re-Projection, Proceedings of 2010 IEEE 17th International Conference on Image Processing, Sep. 26-29, 2010, Hong Kong, pp. 3985-3988.

"International Search Report" dated Feb. 24, 2018 for International application No. PCT/CN2017/114681, International filing date:Dec. 6, 2017.

Lin, the specification, including the claims, and drawings in the U.S. Appl. No. 15/769,750, filed Apr. 20, 2018.

Aljoscha Smolio and David McCutchen,"3DAV Exploration of Video-Based Rendering Technology in MPEG", IEEE Transactions on Circuits and Systems for Video Technology, vol. 14,No. 3, Mar. 2004, pp. 348-356.

Thomas Engelhardt et al., Octahedron Environment Maps, VMV 2008, http://www.vis.uni-stuttgart.de/~engelhts/paper/vmv0ctaMaps. pdf, Visualization Research Center, University of Stuttgart, XP055432198, Jan. 2008.

Emil Praun et al., Spherical Parametrization and Remeshing, Jul. 2003, pp. 340-349, XP058134301.

Yuwen He et al, AHG8: InterDigital's projection format conversion tool, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-12, Document: JVET-D0021, XP030150243.

Philippe Hanhart et al, AHG8: High level syntax extensions for signaling of 360-degree video information, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6, Document: JVET-D0093, XP030150330.

Thomas Engelhardt et al., Octahedron Environment Maps, http://www.vis.uni-stuttgart.de/engelhts/paper/vmvOctaMaps.pdf, VMV 2008, Jan. 1, 2008.

* cited by examiner

METHOD AND APPARATUS FOR DECODING PROJECTION BASED FRAME WITH 360-DEGREE CONTENT REPRESENTED BY TRIANGULAR PROJECTION FACES PACKED IN TRIANGLE-BASED PROJECTION LAYOUT

CROSS REFERENCE TO RELATED APPLICATION

This is a continuation of U.S. application Ser. No. 16/460,958 filed Jul. 2, 2019. U.S. application Ser. No. 16/460,958 is a continuation of U.S. application Ser. No. 15/825,081 filed Nov. 28, 2017, which claims the benefit of U.S. provisional application No. 62/430,968 filed Dec. 7, 2016. The whole contents of the related applications, including U.S. application Ser. No. 16/460,958, U.S. application Ser. No. 15/825,081 and U.S. provisional application No. 62/430,968, are incorporated herein by reference.

BACKGROUND

The present invention relates to processing omnidirectional image/video content, and more particularly, to a method and an apparatus for decoding a projection-based frame with a 360-degree content (e.g., 360-degree image content or 360-degree video content) represented by triangular projection faces packed in an octahedron projection (OHP) layout.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a viewing sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional video content corresponding to the viewing sphere is transformed into a sequence of images, each of which is a projection-based frame with a 360-degree image/video content represented by projection faces arranged in a 360-degree Virtual Reality (360 VR) projection layout, and then the sequence of the projection-based frames is encoded into a bitstream for transmission. However, if the employed 360 VR projection layout is not properly designed, it is possible that the projection-based frame is not compact and/or has many image content discontinuity boundaries that are caused by packing of the projection faces.

SUMMARY

One of the objectives of the claimed invention is to provide a method and an apparatus for decoding a projection-based frame with a 360-degree content (e.g., 360-degree image content or 360-degree video content) represented by triangular projection faces packed in an octahedron projection (OHP) format. With a proper layout design of the octahedron projection format, the projection-based frame can have a compact form that has the minimized number of the discontinuity boundaries inside image content, resulted from the packing of the triangular projection faces.

According to a first aspect of the present invention, an exemplary video processing method is disclosed. The exemplary video processing method includes: receiving a bitstream, and decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces; a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and the triangular projection faces packed in the triangle-based projection layout further comprise a fourth triangular projection face, one side of the fourth triangular projection face connects with yet another side of the second triangular projection face, and there is an image content continuity boundary between said one side of the fourth triangular projection face and said yet another side of the second triangular projection face.

According to a second aspect of the present invention, an exemplary video processing method is disclosed. The exemplary video processing method includes: receiving a bitstream, and decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces; a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and the triangular projection faces packed in the triangle-based projection layout further comprise a fourth triangular projection face, a fifth triangular projection face, and a sixth triangular projection face, another side of the third triangular projection face connects with one side of the fourth triangular projection face, another side of the fourth triangular projection face connects with one side of the fifth triangular projection face, another side of the fifth triangular projection face connects with one side of the sixth triangular projection face, there is an image content continuity boundary between said another side of the third triangular projection face and said one side of the fourth triangular projection face, there is an image content continuity boundary between said another side of the fourth triangular projection face and said one side of the fifth triangular projection face, and there is an image content continuity boundary between said another side of the fifth triangular projection face and said one side of the sixth triangular projection face.

According to a third aspect of the present invention, an exemplary video processing method is disclosed. The exemplary video processing method includes: receiving a bitstream, and decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces; there is an image content discontinuity boundary between sides of any two adjacent triangular projection faces in the triangle-based projection layout; and a shape of the triangle-based projection layout is a rectangle, the triangular projection faces packed in the triangle-based projection layout comprise a first triangular projection face, a second triangular projection face, a third triangular projection face, a fourth triangular projection face, a fifth triangular projection face, a sixth triangular projection face, a seventh triangular projection face, and an eighth triangular projection face, one side of the first triangular projection face connects with one side of the second triangular projection face, one side of the third triangular projection face connects with another side of the second triangular projection face, one side of the fourth triangular projection face connects with another side of the third triangular projection face, one side of the fifth triangular projection face connects with another side of the fourth triangular projection face, one side of the sixth triangular projection face connects with another side of the fifth triangular projection face, one side of the seventh triangular projection face connects with another side of the sixth triangular projection face, the eighth triangular projection face is split into a first right-triangle-shaped part and a second right-triangle-shaped part, the first right-triangle-shaped part has a first side being one side of the eighth triangular projection face and a second side being a first part of another side of the eighth triangular projection face, the second right-triangle-shaped part has a first side being yet another side of the eighth triangular projection face and a second side being a second part of said another side of the eighth triangular projection face, the first side of the first right-triangle-shaped part connects with another side of the seventh triangular projection face, and the first side of the second right-triangle-shaped part connects with another side of the first triangular projection face.

According to a fourth aspect of the present invention, an exemplary video processing apparatus is disclosed. The exemplary video processing apparatus includes a video decoder that is arranged to receive a bitstream and decode the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces; a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and the triangular projection faces packed in the triangle-based projection layout further comprise a fourth triangular projection face, one side of the fourth triangular projection face connects with yet another side of the second triangular projection face, and there is an image content continuity boundary between said one side of the fourth triangular projection face and said yet another side of the second triangular projection face.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
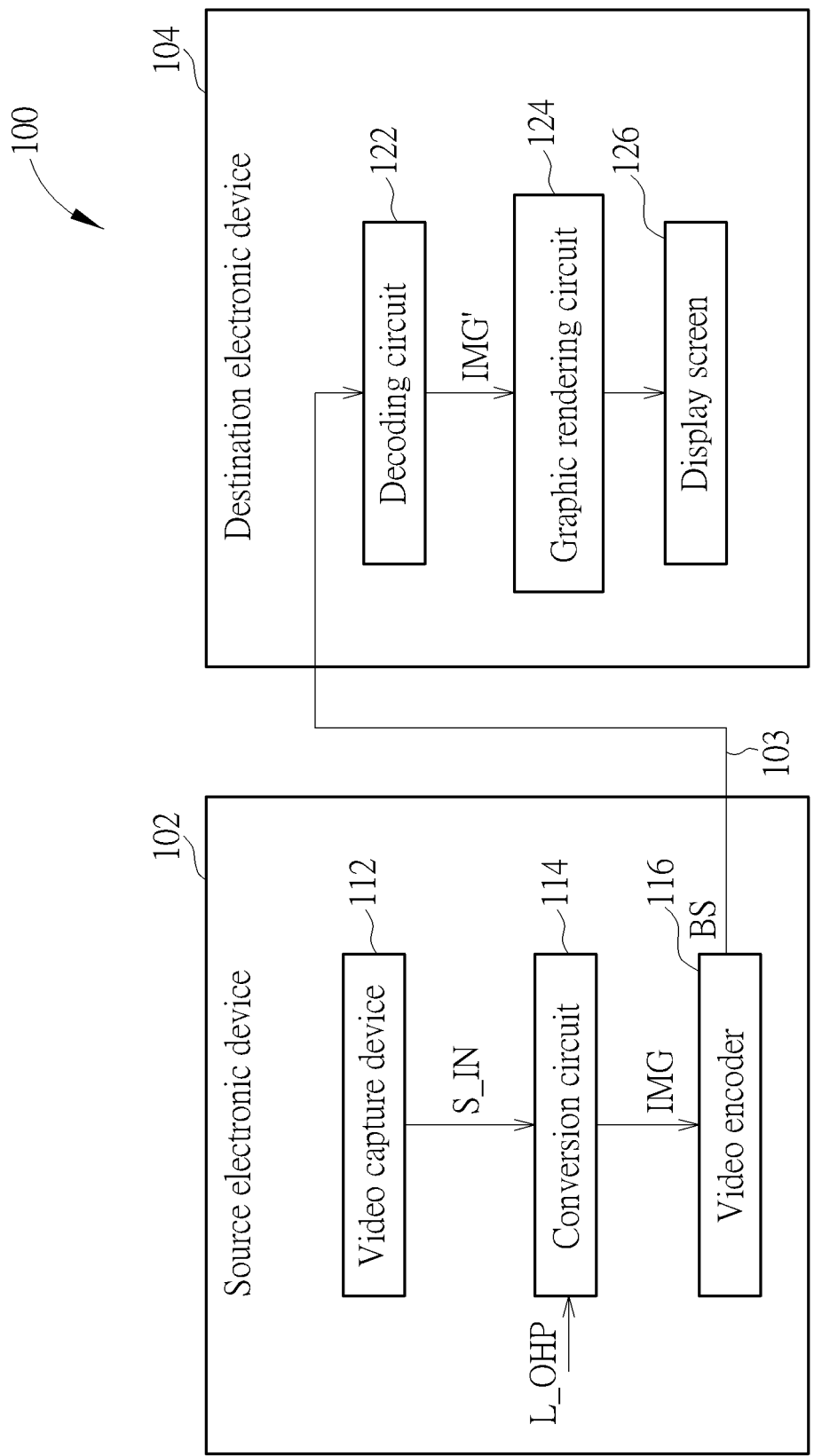
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a viewing sphere. The conversion circuit 114 is coupled between the video capture device 112 and the video encoder 116. The conversion circuit 114 generates a projection-based frame IMG with a 360-degree Virtual Reality (360 VR) projection layout according to the omnidirectional image/video content S_IN. For example, the projection-based frame IMG may be one frame included in a sequence of projection-based frames generated from the conversion circuit 114. The video encoder 116 is an encoding circuit used to encode/compress the projection-based frames IMG to generate a part of a bitstream BS, and outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a decoding circuit (video decoder) 122, a graphic rendering circuit 124, and a display screen 126. The decoding circuit (video decoder) 122 receives the bitstream BS from the transmission means 103 (e.g., a wired/wireless communication link or a storage medium), and decodes the received bitstream BS to generate a decoded frame IMG'. For example, the decoding circuit (video decoder) 122 generates a sequence of decoded frames by decoding the received bitstream BS, where the decoded frame IMG' is one frame included in the sequence of decoded frames. In this embodiment, the projection-based frame IMG to be encoded by the video encoder 116 has a 360 VR projection format with a projection layout. Hence, after the bitstream BS is decoded by the decoding circuit (video decoder) 122, the decoded frame IMG' has the same 360 VR projection format and the same projection layout. The graphic rendering circuit 124 is coupled between the decoding circuit (video decoder) 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

The present invention proposes an innovative octahedron projection (OHP) layout design that has a compact form and that has the minimized number of the discontinuity boundaries resulted from the packing of the triangular projection faces. As mentioned above, the conversion circuit 114 generates the projection-based frame IMG according to a 360 VR projection layout and the omnidirectional image/video content S_IN. In this embodiment, the aforementioned 360 VR projection layout is an octahedron projection layout L_OHP by packing eight triangular projection faces. Specifically, the omnidirectional image/video content S_IN of the viewing sphere is mapped onto the eight triangular projection faces via an octahedron projection of the viewing sphere, and the projection-based frame IMG has a 360-degree image/video content represented by eight triangular projection faces packed in the proposed octahedron projection layout L_OHP.

Figure 2:
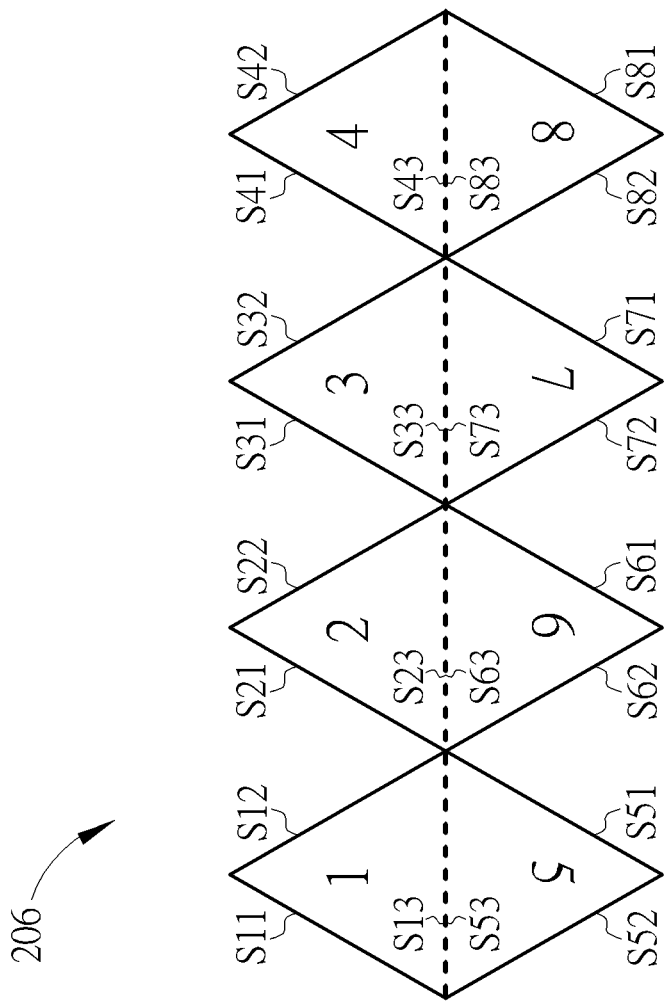
FIG. 2 is a diagram illustrating triangular projection faces of an octahedron projection format that are obtained from an octahedron projection of a viewing sphere according to an unrotated octahedron.
Figure 2:
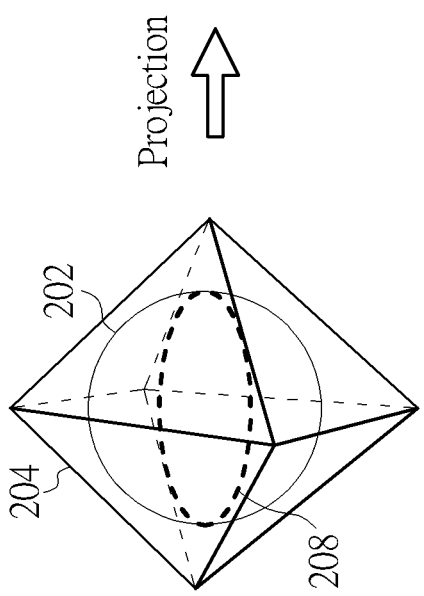

FIG. 2 is a diagram illustrating triangular projection faces of an octahedron projection format that are obtained from an octahedron projection of a viewing sphere according to an unrotated octahedron. An omnidirectional image/video content of a viewing sphere 202 is mapped onto eight triangular projection faces (labeled by reference numbers "1", "2", "3", "4", "5", "6", "7" and "8") of an unrotated octahedron 204. As shown in FIG. 2, the triangular projection faces "1"-"8" are arranged in an octahedron projection layout 206. A shape of each of the triangular projection faces "1"-"8" is an equilateral triangle. For a triangular projection face "K" (K=1-8), this face has three sides, denoted as SK1, SK2, and SK3. The viewing sphere 202 is composed of a top hemisphere (e.g., a northern hemisphere) and a bottom hemisphere (e.g., a southern hemisphere). Due to octahedron projection based on the unrotated octahedron 204, the triangular projection faces "1", "2", "3", and "4" are all derived from the top hemisphere, the triangular projection faces "5", "6", "7", and "8" are all derived from the bottom hemisphere, and an equator 208 of the viewing sphere 202 is mapped along sides S13, S23, S33, S43, S53, S63, S73 and S83 of the triangular projection faces "1"-"8", as indicated by dotted lines.

The projection-based frame IMG to be encoded is required to be rectangular. If the octahedron projection layout 206 is directly used for creating the projection-based frame IMG, the projection-based frame IMG is unable to have a compact frame layout due to many dummy areas (e.g., black areas or white areas) filled in the projection-based frame IMG. Thus, there is a need for a compact octahedron projection layout that can avoid using dummy areas (e.g., black areas or white areas). However, when the triangular projection faces "1"-"8" shown in FIG. 2 are rearranged and packed in a compact octahedron projection layout, some triangular projection faces have to be split and relocated, thus resulting in image content discontinuity of the equator 208 in the projection-based frame IMG. In general, the top and bottom areas of the viewing sphere 202 usually represent "sky" and "ground", respectively, and moving objects in the surrounding environment are mostly located at the equator 208 of the viewing sphere 202. If the equator 208 represented in the projection-based frame IMG has image content discontinuity, the encoding efficiency and the encoded image quality are dramatically degraded. The encoding efficiency and the encoded image quality can be improved if the equator 208 of the viewing sphere 202 is mapped along middles of the triangular projection faces or any positions other than sides of the triangular projection faces. To address this issue, the present invention proposes a novel octahedron projection layout design that can preserve image content continuity of the equator 208. In addition, with a proper design of the octahedron projection layout, the projection-based frame IMG can have a compact layout, and/or the number of the discontinuity boundaries inside image content that are caused by packing of the triangular projection faces can be minimized. The encoding performance of the video encoder 116 can be improved when the projection-based frame IMG has a 360-degree image/video content represented by triangular projection faces packed in the proposed octahedron projection layout.

Figure 3:
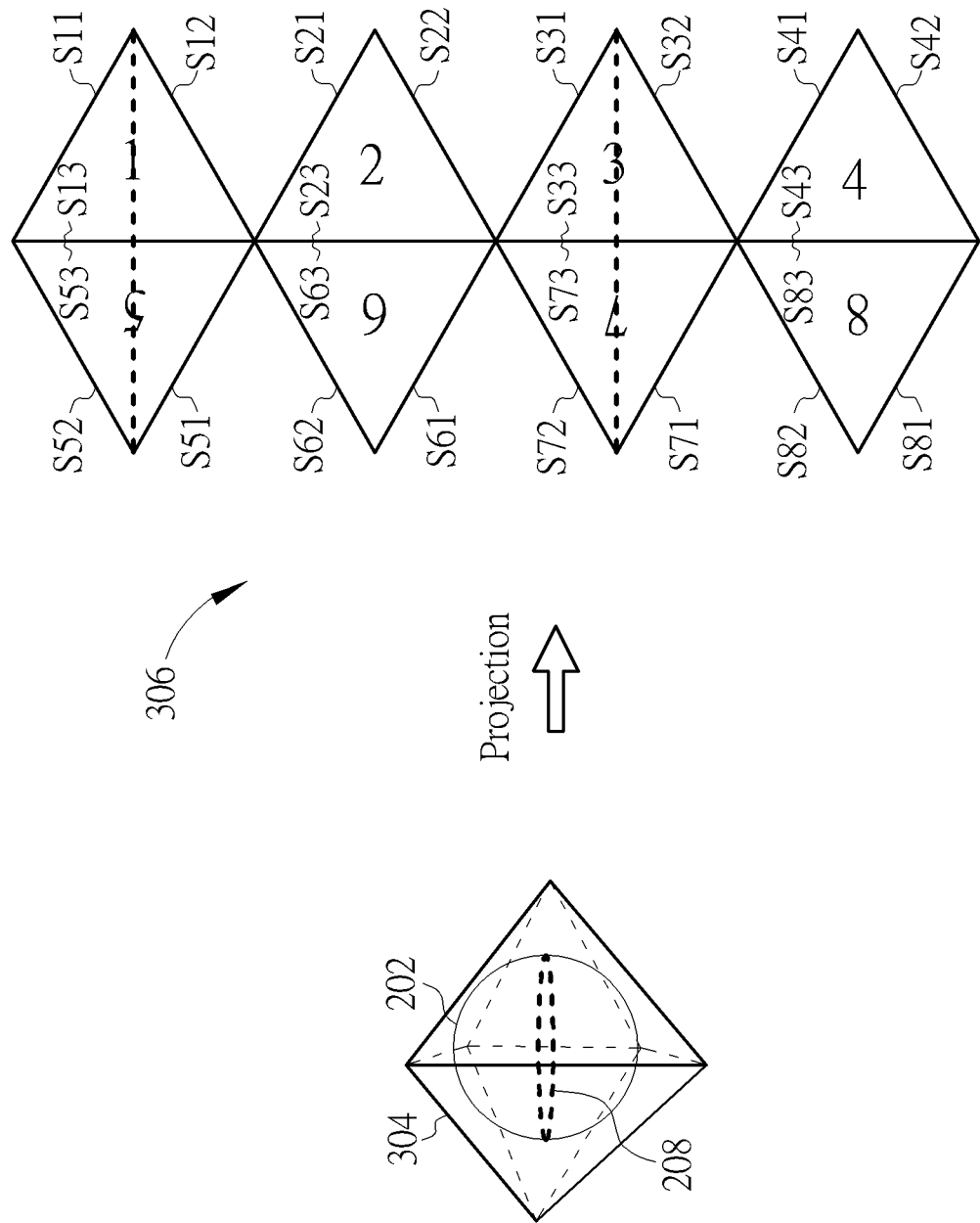
FIG. 3 is a diagram illustrating triangular projection faces of an octahedron projection format that are obtained from an octahedron projection of a viewing sphere according to a rotated octahedron.

FIG. 3 is a diagram illustrating triangular projection faces of an octahedron projection format that are obtained from an octahedron projection of a viewing sphere according to a rotated octahedron. The omnidirectional image/video content of the viewing sphere 202 is mapped onto eight triangular projection faces (labeled by reference numbers "1", "2", "3", "4", "5", "6", "7" and "8") of a rotated octahedron 304. The rotated octahedron 304 shown in FIG. 3 may be obtained by applying 90-degree rotation to the octahedron 204 shown in FIG. 2. As shown in FIG. 3, the triangular projection faces "1"-"8" are packed in an octahedron projection layout 306. A shape of each of the triangular projection faces "1"-"8" is an equilateral triangle. For a triangular projection face "K" (K=1-8), this face has three sides, denoted as SK1, SK2, and SK3. The viewing sphere 202 is composed of a left hemisphere and a right hemisphere. The triangular projection faces "1", "2", "3", and "4" are all derived from the right hemisphere, and the triangular projection faces "5", "6", "7", and "8" are all derived from the left hemisphere. Due to octahedron projection on the rotated octahedron 304, the equator 208 of the viewing sphere 202 is not mapped along any side of each triangular projection face. In this embodiment, the equator 208 of the viewing sphere 202 is mapped along middles of the triangular projection faces "1", "5", "3", and "7", as indicated by dotted lines in FIG. 3.

As mentioned above, the projection-based frame IMG to be encoded is required to be rectangular. Hence, a compact octahedron projection layout should be used by the projection-based frame IMG. Several exemplary compact octahedron projection layouts, each of which has the triangular projection faces "1"-"8" in FIG. 3, are detailed hereinafter.

Figure 4:
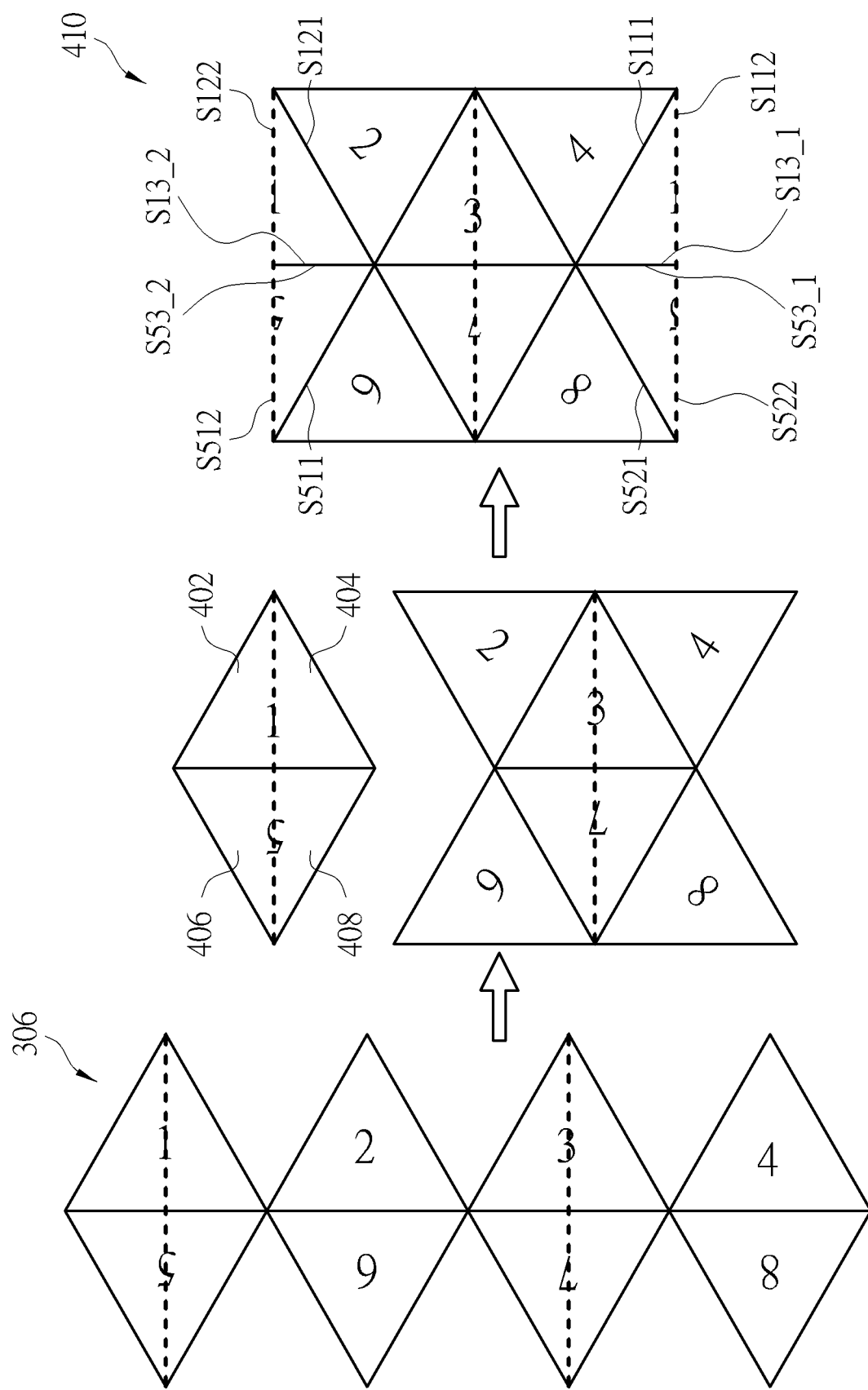
FIG. 4 is a diagram illustrating a first proposed compact octahedron projection layout according to an embodiment of the present invention.

Please refer to FIG. 3 in conjunction with FIG. 4. FIG. 4 is a diagram illustrating a first proposed compact octahedron projection layout according to an embodiment of the present invention. The equator 208 of the viewing sphere 202 is mapped along middles of the triangular projection faces "1", "3", "5", and "7", as indicated by dotted lines in FIG. 4. The first proposed compact octahedron projection layout 410 is derived from the octahedron projection layout 306 with triangular projection face rotation and triangular projection face splitting. As shown in the middle part of FIG. 4, the triangular projection face "2" in the octahedron projection layout 306 is rotated by 60° clockwise, the triangular projection face "6" in the octahedron projection layout 306 is rotated by 60° counterclockwise, the triangular projection face "4" in the octahedron projection layout 306 is rotated by 60° counterclockwise, and the triangular projection face "8" in the octahedron projection layout 306 is rotated by 60° clockwise. Hence, the side S22 of the triangular projection face "2" connects with the side S31 of the triangular projection face "3", the side S61 of the triangular projection face "6" connects with the side S72 of the triangular projection face "7", the side S41 of the triangular projection face "4" connects with the side S32 of the triangular projection face "3", and the side S82 of the triangular projection face "8" connects with the side S71 of the triangular projection face "7".

As shown in the middle part of FIG. 4, an image content continuity boundary exists between the side S22 of the triangular projection face "2" and the side S31 of the triangular projection face "3", an image content continuity boundary exists between the side S61 of the triangular projection face "6" and the side S72 of the triangular projection face "7", an image content continuity boundary exists between the side S41 of the triangular projection face "4" and the side S32 of the triangular projection face "3", an image content continuity boundary exists between the side S82 of the triangular projection face "8" and the side S71 of the triangular projection face "7", and an image content continuity boundary exists between the side S33 of the triangular projection face "3" and the side S73 of the triangular projection face "7".

In addition, the triangular projection face "1" in the octahedron projection layout 306 is split into two right-triangle-shaped parts 402 and 404, and the triangular projection face "5" in the octahedron projection layout 306 is split into two right-triangle-shaped parts 406 and 408. As shown in the right part of FIG. 4, the right-triangle-shaped part 404 of the triangular projection face "1" and the right-triangle-shaped part 408 of the triangular projection face "5" are connected to the triangular projection faces "2" and "6", respectively; and the right-triangle-shaped part 402 of the triangular projection face "1" and the right-triangle-shaped part 406 of the triangular projection face "5" are relocated and connected to the triangular projection faces "4" and "8", respectively.

The right-triangle-shaped part 402 of the triangular projection face "1" has three sides S111, S112, and S13_1, where the side S111 is the side S11 of the triangular projection face "1", and the side S13_1 is a first part of the side S13 of the triangular projection face "1". The right-triangle-shaped part 404 of the triangular projection face "1" has three sides S121, S122, and S13_2, where the side S121 is the side S12 of the triangular projection face "1", and the side S13_2 is a second part of the side S13 of the triangular projection face "1".

The right-triangle-shaped part 406 of the triangular projection face "5" has three sides S521, S522, and S53_1, where the side S521 is the side S52 of the triangular projection face "5", and the side S53_1 is a first part of the side S53 of the triangular projection face "5". The right-triangle-shaped part 408 of the triangular projection face "5" has three sides S511, S512, and S53_2, where the side S511 is the side S51 of the triangular projection face "5", and the side S53_2 is a second part of the side S53 of the triangular projection face "5".

In accordance with the first proposed compact octahedron projection layout 410, the side S121 of the right-triangle-shaped part 404 of the triangular projection face "1" connects with the side S23 of the triangular projection face "2", the side S13_2 of the right-triangle-shaped part 404 of the triangular projection face "1" connects with the side S53_2 of the right-triangle-shaped part 408 of the triangular projection face "5", the side S511 of the right-triangle-shaped part 408 of the triangular projection face "5" connects with the side S63 of the triangular projection face "6", the side S111 of the right-triangle-shaped part 402 of the triangular projection face "1" connects with the side S43 of the triangular projection face "4", the side S13_1 of the right-triangle-shaped part 402 of the triangular projection face "1" connects with the side S53_1 of the right-triangle-shaped part 406 of the triangular projection face "5", and the side S521 of the right-triangle-shaped part 406 of the triangular projection face "5" connects with the side S83 of the triangular projection face "8".

An image content continuity boundary exists between the side S13_2 of the right-triangle-shaped part 404 of the triangular projection face "1" and the side S53_2 of the right-triangle-shaped part 408 of the triangular projection face "5". An image content continuity boundary exists between the side S13_1 of the right-triangle-shaped part 402 of the triangular projection face "1" and the side S53_1 of the right-triangle-shaped part 406 of the triangular projection face "5". Further, an image content discontinuity boundary exists between the side S121 of the right-triangle-shaped part 404 of the triangular projection face "1" and the side S23 of the triangular projection face "2", an image content discontinuity boundary exists between the side S511 of the right-triangle-shaped part 408 of the triangular projection face "5" and the side S63 of the triangular projection face "6", an image content discontinuity boundary exists between the side S111 of the right-triangle-shaped part 402 of the triangular projection face "1" and the side S43 of the triangular projection face "4", and an image content discontinuity boundary exists between the side S521 of the right-triangle-shaped part 406 of the triangular projection face "5" and the side S83 of the triangular projection face "8".

In the right part of FIG. 4, the octahedron projection layout L_OHP arranged by a shape of the first proposed compact octahedron projection layout 410 is a rectangle without any dummy areas (e.g., black areas or white areas). In addition, a portion of the 360-degree image/video content is continuously represented in the triangular projection faces "2", "3", "4", "6", "7", "8" with no image content discontinuity. In this way, the number of image content discontinuity boundaries resulted from packing of the projection faces can be reduced. Moreover, the equator 208 represented by triangular projection faces "1", "3", "5", and "7" in the projection-based image IMG (which uses the first proposed compact octahedron projection layout 410) has no image content discontinuity resulted from triangular projection face splitting.

Figure 5:
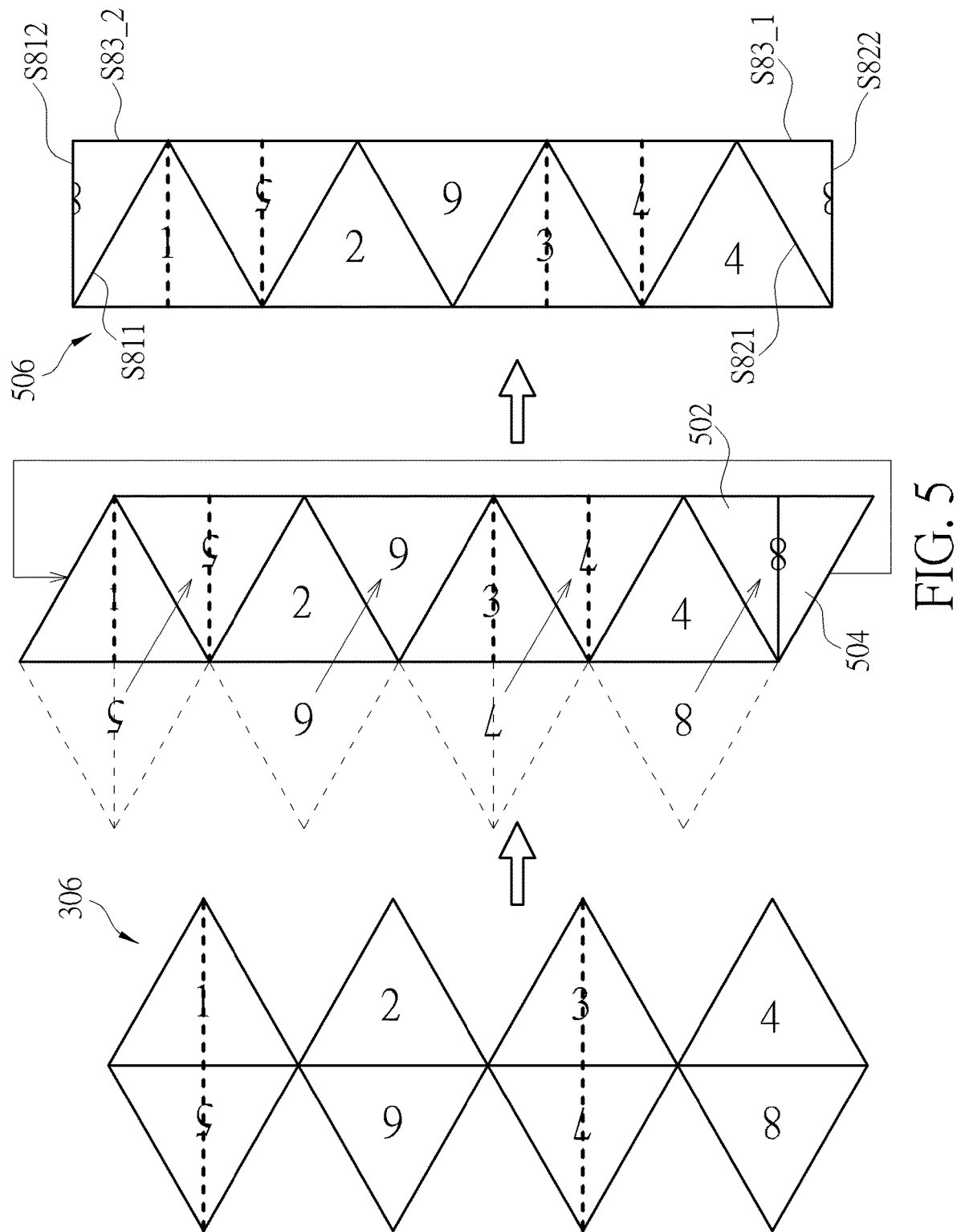
FIG. 5 is a diagram illustrating a second proposed compact octahedron projection layout according to an embodiment of the present invention.

Please refer to FIG. 3 in conjunction with FIG. 5. FIG. 5 is a diagram illustrating a second proposed compact octahedron projection layout according to an embodiment of the present invention. The equator 208 of the viewing sphere 202 is mapped along middles of the triangular projection faces "1", "3", "5", and "7", as indicated by dotted lines in FIG. 5. The second proposed compact octahedron projection layout 506 is derived from the octahedron projection layout 306 with triangular projection face relocation and triangular projection face splitting. As shown in the middle part of FIG. 5, the triangular projection face "5" in the octahedron projection layout 306 is moved to a space between the triangular projection faces "1" and "2" in the octahedron projection layout 306, the triangular projection face "6" in the octahedron projection layout 306 is moved to a space between the triangular projection faces "2" and "3" in the octahedron projection layout 306, the triangular projection face "7" in the octahedron projection layout 306 is moved to a space between the triangular projection faces "3" and "4" in the octahedron projection layout 306, and the triangular projection face "8" in the octahedron projection layout 306 is moved to a space adjacent to the triangular projection face "4" in the octahedron projection layout 306. Hence, the side S12 of the triangular projection face "1" connects with the side S52 of the triangular projection face "5", the side S51 of the triangular projection face "5" connects with the side S21 of the triangular projection face "2", the side S22 of the triangular projection face "2" connects with the side S62 of the triangular projection face "6", the side S61 of the triangular projection face "6" connects with the side S31 of the triangular projection face "3", the side S32 of the triangular projection face "3" connects with the side S72 of the triangular projection face "7", the side S71 of the triangular projection face "7" connects with the side S41 of the triangular projection face "4", and the side S42 of the triangular projection face "4" connects with the side S82 of the triangular projection face "8".

As shown in the middle part of FIG. 5, an image content discontinuity boundary exists between the side S12 of the triangular projection face "1" and the side S52 of the triangular projection face "5", an image content discontinuity boundary exists between the side S51 of the triangular projection face "5" and the side S21 of the triangular projection face "2", an image content discontinuity boundary exists between the side S22 of the triangular projection face "2" and the side S62 of the triangular projection face "6", an image content discontinuity boundary exists between the side S61 of the triangular projection face "6" and the side S31 of the triangular projection face "3", an image content discontinuity boundary exists between the side S32 of the triangular projection face "3" and the side S72 of the triangular projection face "7", and an image content discontinuity boundary exists between the side S71 of the triangular projection face "7" and the side S41 of the triangular projection face "4".

In addition, the triangular projection face "8" is split into two right-triangle-shaped parts 502 and 504. As shown in the right part of FIG. 5, the right-triangle-shaped part 502 of the triangular projection face "8" remains connected to the triangular projection face "4", and the right-triangle-shaped part 504 of the triangular projection face "8" is relocated and connected to the triangular projection face "1". The right-triangle-shaped part 502 of the triangular projection face "8" has three sides S821, S822, and S83_1, where the side S821 is the side S82 of the triangular projection face "8", and the side S83_1 is a first part of the side S83 of the triangular projection face "8". The right-triangle-shaped part 504 of the triangular projection face "8" has three sides S811, S812, and S83_2, where the side S811 is the side S81 of the triangular projection face "8", and the side S83_2 is a second part of the side S83 of the triangular projection face "8".

In accordance with the second proposed compact octahedron projection layout 506, the side S811 of the right-triangle-shaped part 504 of the triangular projection face "8" connects with the side S11 of the triangular projection face "1", and the side S821 of the right-triangle-shaped part 502 of the triangular projection face "8" connects with the side S42 of the triangular projection face "4". An image content discontinuity boundary exists between the side S811 of the right-triangle-shaped part 504 of the triangular projection face "8" and the side S11 of the triangular projection face "1", and an image content discontinuity boundary exists between the side S821 of the right-triangle-shaped part 502 of the triangular projection face "8" and the side S42 of the triangular projection face "4".

In the right part of FIG. 5, the octahedron projection layout L_OHP arranged by a shape of the second proposed compact octahedron projection layout 506 is a rectangle without any dummy areas (e.g., black areas or white areas). In addition, the equator 208 represented by triangular projection faces "1", "3", "5", and "7" in the projection-based image IMG (which uses the second proposed compact octahedron projection layout 506) has no image content discontinuity resulted from triangular projection face splitting.

Figure 6:
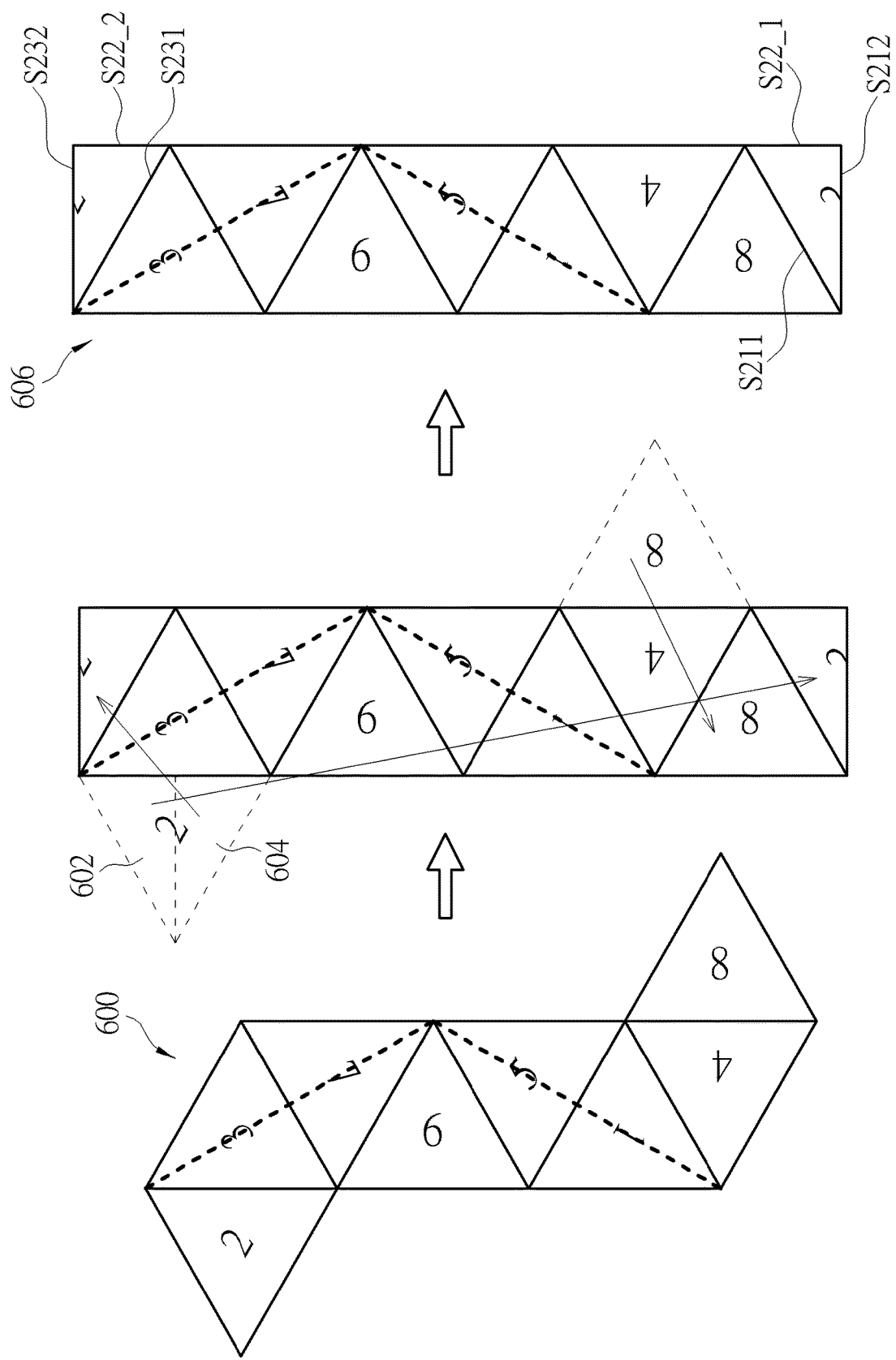
FIG. 6 is a diagram illustrating a third proposed compact octahedron projection layout according to an embodiment of the present invention.

Please refer to FIG. 3 in conjunction with FIG. 6. FIG. 6 is a diagram illustrating a third proposed compact octahedron projection layout according to an embodiment of the present invention. The equator 208 of the viewing sphere 202 is mapped along middles of the triangular projection faces "1", "3", "5", and "7", as indicated by dotted lines in FIG. 6. The third proposed compact octahedron projection layout 606 is derived from an octahedron projection layout 600 with projection face relocation and triangular projection face splitting, where the octahedron projection layout 600 is derived by rearranging the triangular projection faces "1"-"8" of the octahedron projection layout 306. Regarding the octahedron projection layout 600, the side S22 of the triangular projection face "2" connects with the side S31 of the triangular projection face "3", the side S33 of the triangular projection face "3" connects with the side S73 of the triangular projection face "7", the side S72 of the triangular projection face "7" connects with the side S61 of the triangular projection face "6", the side S62 of the triangular projection face "6" connects with the side S51 of the triangular projection face "5", the side S53 of the triangular projection face "5" connects with the side S13 of the triangular projection face "1", the side S11 of the triangular projection face "1" connects with the side S42 of the triangular projection face "4", and the side S43 of the triangular projection face "4" connects with the side S83 of the triangular projection face "8".

Regarding the octahedron projection layout 600, an image content continuity boundary exists between the side S22 of the triangular projection face "2" and the side S31 of the triangular projection face "3", an image content continuity boundary exists between the side S33 of the triangular projection face "3" and the side S73 of the triangular projection face "7", an image content continuity boundary exists between the side S72 of the triangular projection face "7" and the side S61 of the triangular projection face "6", an image content continuity boundary exists between the side S62 of the triangular projection face "6" and the side S51 of the triangular projection face "5", an image content continuity boundary exists between the side S53 of the triangular projection face "5" and the side S13 of the triangular projection face "1", an image content continuity boundary exists between the side S11 of the triangular projection face "1" and the side S42 of the triangular projection face "4", and an image content continuity boundary exists between the side S43 of the triangular projection face "4" and the side S83 of the triangular projection face "8". Though the whole 360-degree image/video content can be represented in the octahedron projection layout 600 with no image content discontinuity, the octahedron projection layout 600 is not compact due to the fact that a shape of the octahedron projection layout 600 is not a rectangle.

As shown in the middle part of FIG. 6, the triangular projection face "8" in the octahedron projection layout 600 is relocated and connected to the triangular projection face "4", and the triangular projection face "2" in the octahedron projection layout 600 is split into two right-triangle-shaped parts 602 and 604, where right-triangle-shaped parts 604 and 602 of the triangular projection face "2" are relocated and connected to the triangular projection face "3" and the relocated triangular projection face "8", respectively. The right-triangle-shaped part 602 of the triangular projection face "2" has three sides S211, S212, and S22_1, where the side S211 is the side S21 of the triangular projection face "2", and the side S22_1 is a first part of the side S22 of the triangular projection face "2". The right-triangle-shaped part 604 of the triangular projection face "2" has three sides S231, S232, and S22_2, where the side S231 is the side S23 of the triangular projection face "2", and the side S22_2 is a second part of the side S22 of the triangular projection face "2".

In accordance with the third proposed compact octahedron projection layout 606, the side S81 of the triangular projection face "8" connects with the side S41 of the triangular projection face "4", the side S231 of the right-triangle-shaped part 604 of the triangular projection face "2" connects with the side S32 of the triangular projection face "3", and the side S211 of the right-triangle-shaped part 602 of the triangular projection face "2" connects with the side S82 of the triangular projection face "8". An image content discontinuity boundary exists between the side S81 of the triangular projection face "8" and the side S41 of the triangular projection face "4". An image content discontinuity boundary exists between the side S231 of the right-triangle-shaped part 604 of the triangular projection face "2" and the side S32 of the triangular projection face "3". An image content discontinuity boundary exists between the side S211 of the right-triangle-shaped part 602 of the triangular projection face "2" and the side S82 of the triangular projection face "8".

In the right part of FIG. 6, the octahedron projection layout L_OHP arranged by a shape of the third proposed compact octahedron projection layout 606 is a rectangle without any dummy areas (e.g., black areas or white areas). In addition, a portion of the 360-degree image/video content is continuously represented in the triangular projection faces "3", "7", "6", "5", "1", and "4" with no image content discontinuity. In this way, the number of image content discontinuity boundaries resulted from packing of the projection faces can be reduced. Moreover, the equator 208 represented by triangular projection faces "1", "3", "5", and "7" in the projection-based image IMG (which uses the third proposed compact octahedron projection layout 606) has no image content discontinuity resulted from triangular projection face splitting.

Figure 7:
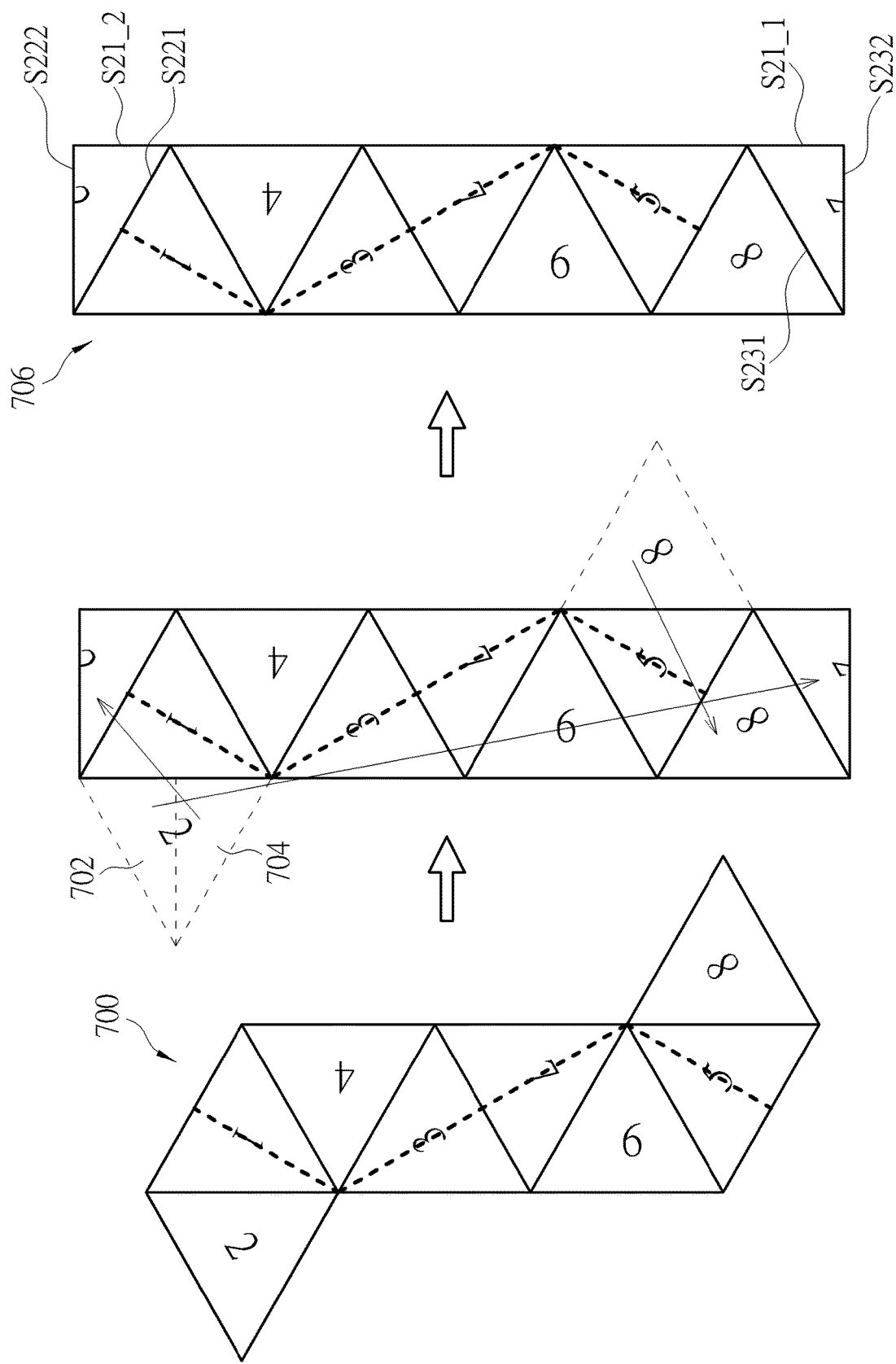
FIG. 7 is a diagram illustrating a fourth proposed compact octahedron projection layout according to an embodiment of the present invention.

Please refer to FIG. 3 in conjunction with FIG. 7. FIG. 7 is a diagram illustrating a fourth proposed compact octahedron projection layout according to an embodiment of the present invention. The equator 208 of the viewing sphere 202 is mapped along middles of the triangular projection faces "1", "3", "5", and "7", as indicated by dotted lines in FIG. 7. The fourth proposed compact octahedron projection layout 706 is derived from an octahedron projection layout 700 with projection face relocation and triangular projection face splitting, where the octahedron projection layout 700 is derived by rearranging the triangular projection faces "1"-"8" of the octahedron projection layout 306. Regarding the octahedron projection layout 700, the side S21 of the triangular projection face "2" connects with the side S12 of the triangular projection face "1", the side S11 of the triangular projection face "1" connects with the side S42 of the triangular projection face "4", the side S41 of the triangular projection face "4" connects with the side S32 of the triangular projection face "3", the side S33 of the triangular projection face "3" connects with the side S73 of the triangular projection face "7", the side S72 of the triangular projection face "7" connects with the side S61 of the triangular projection face "6", the side S62 of the triangular projection face "6" connects with the side S51 of the triangular projection face "5", and the side S52 of the triangular projection face "5" connects with the side S81 of the triangular projection face "8".

Regarding the octahedron projection layout 700, an image content continuity boundary exists between the side S21 of the triangular projection face "2" and the side S12 of the triangular projection face "1", an image content continuity boundary exists between the side S11 of the triangular projection face "1" and the side S42 of the triangular projection face "4", an image content continuity boundary exists between the side S41 of the triangular projection face "4" and the side S32 of the triangular projection face "3", an image content continuity boundary exists between the side S33 of the triangular projection face "3" and the side S73 of the triangular projection face "7", an image content continuity boundary exists between the side S72 of the triangular projection face "7" and the side S61 of the triangular projection face "6", an image content continuity boundary exists between the side S62 of the triangular projection face "6" and the side S51 of the triangular projection face "5", and an image content continuity boundary exists between the side S52 of the triangular projection face "5" and the side S81 of the triangular projection face "8". Though the whole 360-degree image/video content can be represented in the octahedron projection layout 700 with no image content discontinuity, the octahedron projection layout 700 is not compact due to the fact that a shape of the octahedron projection layout 700 is not a rectangle.

As shown in the middle part of FIG. 7, the triangular projection face "8" in octahedron projection layout 700 is relocated and connected to the triangular projection face "5", and the triangular projection face "2" in octahedron projection layout 700 is split into two right-triangle-shaped parts 702 and 704, where right-triangle-shaped parts 704 and 702 of the triangular projection face "2" are relocated and connected to the triangular projection face "1" and the relocated triangular projection face "8", respectively. The right-triangle-shaped part 702 of the triangular projection face "2" has three sides S231, S232, and S21_1, where the side S231 is the side S23 of the triangular projection face "2", and the side S21_1 is a first part of the side S21 of the triangular projection face "2". The right-triangle-shaped part 704 of the triangular projection face "2" has three sides S221, S222, and S21_2, where the side S221 is the side S22 of the triangular projection face "2", and the side S21_2 is a second part of the side S21 of the triangular projection face "2".

In accordance with the fourth proposed compact octahedron projection layout 706, the side S82 of the triangular projection face "8" connects with the side S53 of the triangular projection face "5", the side S221 of the right-triangle-shaped part 704 of the triangular projection face "2" connects with the side S13 of the triangular projection face "1", and the side S231 of the right-triangle-shaped part 702 of the triangular projection face "2" connects with the side S83 of the triangular projection face "8". An image content discontinuity boundary exists between the side S82 of the triangular projection face "8" and the side S53 of the triangular projection face "5". An image content discontinuity boundary exists between the side S221 of the right-triangle-shaped part 704 of the triangular projection face "2" and the side S13 of the triangular projection face "1". An image content discontinuity boundary exists between the side S231 of the right-triangle-shaped part 702 of the triangular projection face "2" and the side S83 of the triangular projection face "8".

In the right part of FIG. 7, the octahedron projection layout L_OHP arranged by a shape of the fourth proposed compact octahedron projection layout 706 is a rectangle without any dummy areas (e.g., black areas or white areas). In addition, a portion of the 360-degree image/video content is continuously represented in the triangular projection faces "1", "4", "3", "7", "6", and "5" with no image content discontinuity. In this way, the number of image content discontinuity boundaries resulted from packing of the projection faces can be reduced. Moreover, the equator 208 represented by triangular projection faces "1", "3", "5", and "7" in the projection-based image IMG (which uses the fourth proposed compact octahedron projection layout 706) has no image content discontinuity resulted from triangular projection face splitting.

Figure 8:
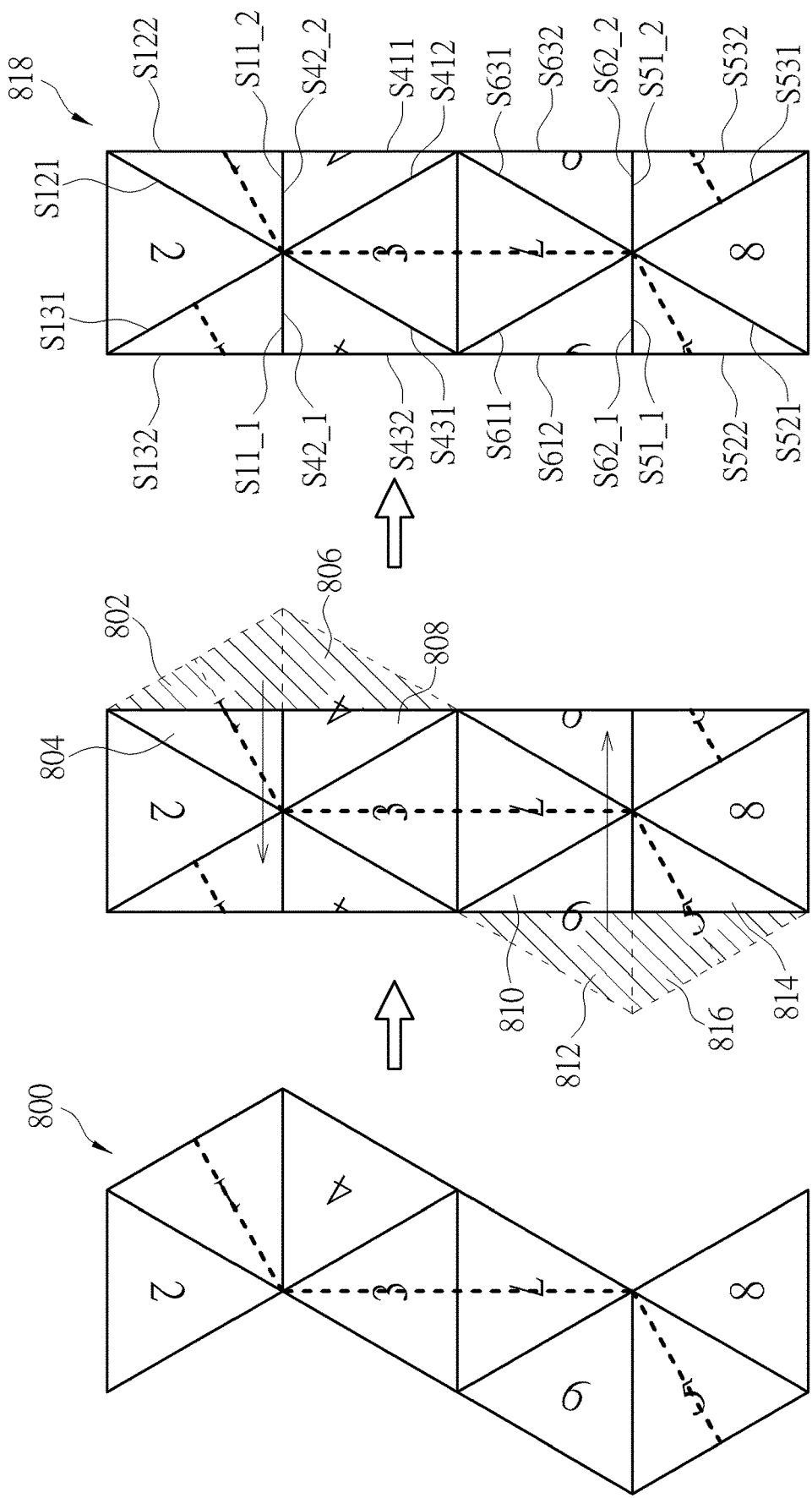
FIG. 8 is a diagram illustrating a fifth proposed compact octahedron projection layout according to an embodiment of the present invention.

Please refer to FIG. 3 in conjunction with FIG. 8. FIG. 8 is a diagram illustrating a fifth proposed compact octahedron projection layout according to an embodiment of the present invention. The equator 208 of the viewing sphere 202 is mapped along middles of the triangular projection faces "1", "3", "5", and "7", as indicated by dotted lines in FIG. 8. The fifth proposed compact octahedron projection layout 818 is derived by an octahedron projection layout 800 with triangular projection face splitting, where the octahedron projection layout 800 is derived from rearranging the triangular projection faces "1"-"8" of the octahedron projection layout 306. Regarding the octahedron projection layout 800, the side S21 of the triangular projection face "2" connects with the side S12 of the triangular projection face "1", the side S11 of the triangular projection face "1" connects with the side S42 of the triangular projection face "4", the side S41 of the triangular projection face "4" connects with the side S32 of the triangular projection face "3", the side S33 of the triangular projection face "3" connects with the side S73 of the triangular projection face "7", the side S72 of the triangular projection face "7" connects with the side S61 of the triangular projection face "6", the side S62 of the triangular projection face "6" connects with the side S51 of the triangular projection face "5", and the side S52 of the triangular projection face "5" connects with the side S81 of the triangular projection face "8". Specifically, the octahedron projection layout 800 may be derived from rotating the octahedron projection layout 700 by 30° clockwise.

Regarding the octahedron projection layout 800, an image content continuity boundary exists between the side S21 of the triangular projection face "2" and the side S12 of the triangular projection face "1", an image content continuity boundary exists between the side S11 of the triangular projection face "1" and the side S42 of the triangular projection face "4", an image content continuity boundary exists between the side S41 of the triangular projection face "4" and the side S32 of the triangular projection face "3", an image content continuity boundary exists between the side S33 of the triangular projection face "3" and the side S73 of the triangular projection face "7", an image content continuity boundary exists between the side S72 of the triangular projection face "7" and the side S61 of the triangular projection face "6", an image content continuity boundary exists between the side S62 of the triangular projection face "6" and the side S51 of the triangular projection face "5", and an image content continuity boundary exists between the side S52 of the triangular projection face "5" and the side S81 of the triangular projection face "8". Though the whole 360-degree image/video content can be represented in the octahedron projection layout 800 with no image content discontinuity, the octahedron projection layout 800 is not compact due to the fact that a shape of the octahedron projection layout 800 is not a rectangle.

As shown in the middle part of FIG. 8, the triangular projection face "1" in the octahedron projection layout 800 is split into two right-triangle-shaped parts 802 and 804, the triangular projection face "4" in the octahedron projection layout 800 is split into two right-triangle-shaped parts 806 and 808, the triangular projection face "6" in the octahedron projection layout 800 is split into two right-triangle-shaped parts 810 and 812, and the triangular projection face "5" in the octahedron projection layout 800 is split into two right-triangle-shaped parts 814 and 816, where the right-triangle-shaped part 802 of the triangular projection face "1" is relocated and connected to the triangular projection face "2", the right-triangle-shaped part 806 of the triangular projection face "4" is relocated and connected the triangular projection face "3", the right-triangle-shaped part 812 of the triangular projection face "6" is relocated and connected to the triangular projection face "7", and the right-triangle-shaped part 816 of the triangular projection face "5" is relocated and connected to the triangular projection face "8".

The right-triangle-shaped part 802 of the triangular projection face "1" has three sides S131, S132, and S11_1, where the side S131 is the side S13 of the triangular projection face "1", and the side S11_1 is a first part of the side S11 of the triangular projection face "1". The right-triangle-shaped part 804 of the triangular projection face "1" has three sides S121, S122, and S11_2, where the side S121 is the side S12 of the triangular projection face "1", and the side S11_2 is a second part of the side S11 of the triangular projection face "1".

The right-triangle-shaped part 806 of the triangular projection face "4" has three sides S431, S432, and S42_1, where the side S431 is the side S43 of the triangular projection face "4", and the side S42_1 is a first part of the side S42 of the triangular projection face "4". The right-triangle-shaped part 808 of the triangular projection face "4" has three sides S411, S412, and S42_2, where the side S411 is the side S41 of the triangular projection face "4", and the side S42_2 is a second part of the side S42 of the triangular projection face "4".

The right-triangle-shaped part 810 of the triangular projection face "6" has three sides S611, S612, and S62_1, where the side S611 is the side S61 of the triangular projection face "6", and the side S62_1 is a first part of the side S62 of the triangular projection face "6". The right-triangle-shaped part 812 of the triangular projection face "6" has three sides S631, S632, and S62_2, where the side S631 is the side S63 of the triangular projection face "6", and the side S62_2 is a second part of the side S62 of the triangular projection face "6".

The right-triangle-shaped part 814 of the triangular projection face "5" has three sides S521, S522, and S51_1, where the side S521 is the side S52 of the triangular projection face "5", and the side S51_1 is a first part of the side S51 of the triangular projection face "5". The right-triangle-shaped part 816 of the triangular projection face "5" has three sides S531, S532, and S51_2, where the side S531 is the side S53 of the triangular projection face "5", and the side S51_2 is a second part of the side S51 of the triangular projection face "5".

In accordance with the fifth proposed compact octahedron projection layout 606, the side S131 of the right-triangle-shaped part 802 of the triangular projection face "1" connects with the side S22 of the triangular projection face "2", the side S11_1 of the right-triangle-shaped part 802 of the triangular projection face "1" connects with the side S42_1 of the right-triangle-shaped part 806 of the triangular projection face "4", the side S431 of the right-triangle-shaped part 806 of the triangular projection face "4" connects with the side S31 of the triangular projection face "3", the side S631 of the right-triangle-shaped part 812 of the triangular projection face "6" connects with the side S71 of the triangular projection face "7", the side S62_2 of the right-triangle-shaped part 812 of the triangular projection face "6" connects with the side S51_2 of the right-triangle-shaped part 816 of the triangular projection face "5", and the side S531 of the right-triangle-shaped part 816 of the triangular projection face "5" connects with the side S82 of the triangular projection face "8".

An image content continuity boundary exists between the side S11_1 of the right-triangle-shaped part 802 of the triangular projection face "1" and the side S42_1 of the right-triangle-shaped part 806 of the triangular projection face "4". An image content continuity boundary exists between the side S62_2 of the right-triangle-shaped part 812 of the triangular projection face "6" and the side S51_2 of the right-triangle-shaped part 816 of the triangular projection face "5".

In addition, an image content discontinuity boundary exists between the side S131 of the right-triangle-shaped part 802 of the triangular projection face "1" and the side S22 of the triangular projection face "2", an image content discontinuity boundary exists between the side S431 of the right-triangle-shaped part 806 of the triangular projection face "4" and the side S31 of the triangular projection face "3", an image content discontinuity boundary exists between the side S631 of the right-triangle-shaped part 812 of the triangular projection face "6" and the side S71 of the triangular projection face "7", and an image content discontinuity boundary exists between the side S531 of the right-triangle-shaped part 816 of the triangular projection face "5" and the side S82 of the triangular projection face "8".

In the right part of FIG. 8, the octahedron projection layout L_OHP arranged by a shape of the fifth proposed compact octahedron projection layout 818 is a rectangle without any dummy areas (e.g., black areas or white areas). In addition, a portion of the 360-degree image/video content is continuously represented in the triangular projection face "2", the right-triangle-shaped parts 804, 808, the triangular projection faces "3", "7", the right-triangle-shaped parts 810, 814 and the triangular projection face "8" with no image content discontinuity. In this way, the number of image content discontinuity boundaries resulted from packing of the projection faces can be reduced.

Figure 9:
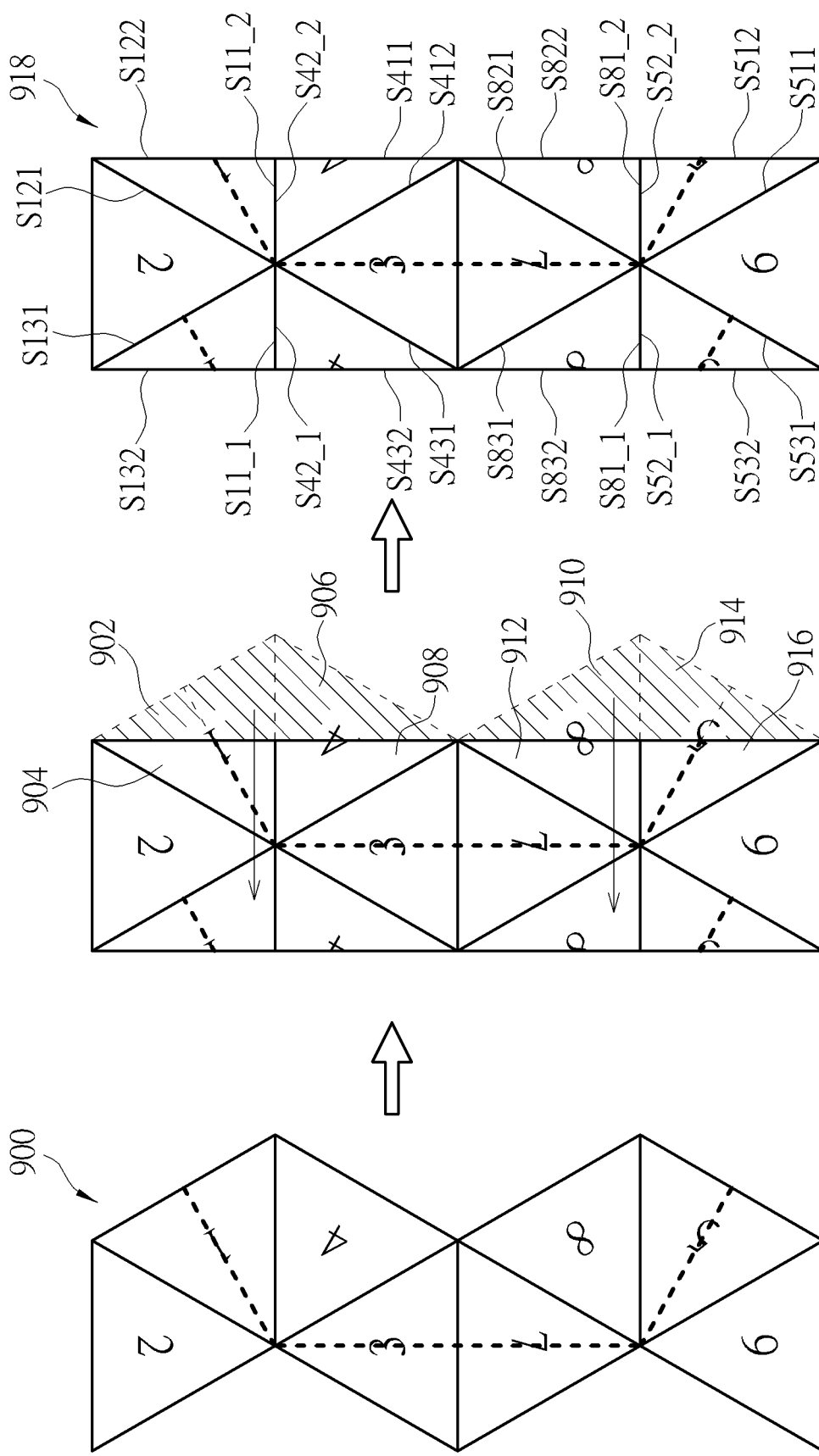
FIG. 9 is a diagram illustrating a sixth proposed compact octahedron projection layout according to an embodiment of the present invention.

Please refer to FIG. 3 in conjunction with FIG. 9. FIG. 9 is a diagram illustrating a sixth proposed compact octahedron projection layout according to an embodiment of the present invention. The equator 208 of the viewing sphere 202 is mapped along middles of the triangular projection faces "1", "3", "5", and "7", as indicated by dotted lines in FIG. 9. The sixth proposed compact octahedron projection layout 918 is derived by an octahedron projection layout 900 with triangular projection face splitting, where the octahedron projection layout 900 is derived by rearranging the triangular projection faces "1"-"8" of the octahedron projection layout 306. Regarding the octahedron projection layout 900, the side S21 of the triangular projection face "2"

connects with the side S12 of the triangular projection face "1", the side S11 of the triangular projection face "1" connects with the side S42 of the triangular projection face "4", the side S41 of the triangular projection face "4" connects with the side S32 of the triangular projection face "3", the side S33 of the triangular projection face "3" connects with the side S73 of the triangular projection face "7", the side S71 of the triangular projection face "7" connects with the side S82 of the triangular projection face "8", the side S81 of the triangular projection face "8" connects with the side S52 of the triangular projection face "5", and the side S51 of the triangular projection face "5" connects with the side S62 of the triangular projection face "6".

Regarding the octahedron projection layout 900, an image content continuity boundary exists between the side S21 of the triangular projection face "2" and the side S12 of the triangular projection face "1", an image content continuity boundary exists between the side S11 of the triangular projection face "1" and the side S42 of the triangular projection face "4", an image content continuity boundary exists between the side S41 of the triangular projection face "4" and the side S32 of the triangular projection face "3", an image content continuity boundary exists between the side S33 of the triangular projection face "3" and the side S73 of the triangular projection face "7", an image content continuity boundary exists between the side S71 of the triangular projection face "7" and the side S82 of the triangular projection face "8", an image content continuity boundary exists between the side S81 of the triangular projection face "8" and the side S52 of the triangular projection face "5", and an image content continuity boundary exists between the side S51 of the triangular projection face "5" and the side S62 of the triangular projection face "6". Though the whole 360-degree image/video content can be represented in the octahedron projection layout 900 with no image content discontinuity, the octahedron projection layout 900 is not compact due to the fact that a shape of the octahedron projection layout 900 is not a rectangle.

As shown in the middle part of FIG. 9, the triangular projection face "1" in the octahedron projection layout 900 is split into two right-triangle-shaped parts 902 and 904, the triangular projection face "4" in the octahedron projection layout 900 is split into two right-triangle-shaped parts 906 and 908, the triangular projection face "8" in the octahedron projection layout 900 is split into two right-triangle-shaped parts 910 and 912, and the triangular projection face "5" in the octahedron projection layout 900 is split into two right-triangle-shaped parts 914 and 916, where the right-triangle-shaped part 902 of the triangular projection face "1" is relocated and connected to the triangular projection face "2", the right-triangle-shaped part 906 of the triangular projection face "4" is relocated and connected to the triangular projection face "3", the right-triangle-shaped part 910 of the triangular projection face "8" is relocated and connected to the triangular projection face "7", and the right-triangle-shaped part 914 of the triangular projection face "5" is relocated and connected to the triangular projection face "6".

The right-triangle-shaped part 902 of the triangular projection face "1" has three sides S131, S132, and S11_1, where the side S131 is the side S13 of the triangular projection face "1", and the side S11_1 is a first part of the side S11 of the triangular projection face "1". The right-triangle-shaped part 904 of the triangular projection face "1" has three sides S121, S122, and S11_2, where the side S121 is the side S12 of the triangular projection face "1", and the side S11_2 is a second part of the side S11 of the triangular projection face "1".

The right-triangle-shaped part 906 of the triangular projection face "4" has three sides S431, S432, and S42_1, where the side S431 is the side S43 of the triangular projection face "4", and the side S42_1 is a first part of the side S42 of the triangular projection face "4". The right-triangle-shaped part 908 of the triangular projection face "4" has three sides S411, S412, and S42_2, where the side S411 is the side S41 of the triangular projection face "4", and the side S42_2 is a second part of the side S42 of the triangular projection face "4".

The right-triangle-shaped part 910 of the triangular projection face "8" has three sides S831, S832, and S81_1, where the side S831 is the side S83 of the triangular projection face "8", and the side S81_1 is a first part of the side S81 of the triangular projection face "8". The right-triangle-shaped part 912 of the triangular projection face "8" has three sides S821, S822, and S81_2, where the side S821 is the side S82 of the triangular projection face "8", and the side S81_2 is a second part of the side S81 of the triangular projection face "8".

The right-triangle-shaped part 914 of the triangular projection face "5" has three sides S531, S532, and S52_1, where the side S531 is the side S53 of the triangular projection face "5", and the side S52_1 is a first part of the side S52 of the triangular projection face "5". The right-triangle-shaped part 916 of the triangular projection face "5" has three sides S511, S512, and S52_2, where the side S511 is the side S51 of the triangular projection face "5", and the side S52_2 is a second part of the side S52 of the triangular projection face "5".

In accordance with the sixth proposed compact octahedron projection layout 606, the side S131 of the right-triangle-shaped part 902 of the triangular projection face "1" connects with the side S22 of the triangular projection face "2", the side S11_1 of the right-triangle-shaped part 902 of the triangular projection face "1" connects with the side S42_1 of the right-triangle-shaped part 906 of the triangular projection face "4", the side S431 of the right-triangle-shaped part 906 of the triangular projection face "4" connects with the side S31 of the triangular projection face "3", the side S831 of the right-triangle-shaped part 910 of the triangular projection face "8" connects with the side S72 of the triangular projection face "7", the side S81_1 of the right-triangle-shaped part 910 of the triangular projection face "8" connects with the side S52_1 of the right-triangle-shaped part 914 of the triangular projection face "5", and the side S531 of the right-triangle-shaped part 914 of the triangular projection face "5" connects with the side S61 of the triangular projection face "6".

An image content continuity boundary exists between the side S11_1 of the right-triangle-shaped part 902 of the triangular projection face "1" and the side S42_1 of the right-triangle-shaped part 906 of the triangular projection face "4". An image content continuity boundary exists between the side S81_1 of the right-triangle-shaped part 910 of the triangular projection face "8" and the side S52_1 of the right-triangle-shaped part 914 of the triangular projection face "5".

In addition, an image content discontinuity boundary exists between the side S131 of the right-triangle-shaped part 902 of the triangular projection face "1" and the side S22 of the triangular projection face "2", an image content discontinuity boundary exists between the side S431 of the right-triangle-shaped part 906 of the triangular projection face "4" and the side S31 of the triangular projection face "3", an image content discontinuity boundary exists between the side S831 of the right-triangle-shaped part 910 of the triangular projection face "8" and the side S72 of the triangular projection face "7", and an image content discontinuity boundary exists between the side S531 of the right-triangle-shaped part 914 of the triangular projection face "5" and the side S61 of the triangular projection face "6".

In the right part of FIG. 9, the octahedron projection layout L_OHP arranged by a shape of the sixth proposed compact octahedron projection layout 918 is a rectangle without any dummy areas (e.g., black areas or white areas). In addition, a portion of the 360-degree image/video content is continuously represented in the triangular projection face "2", the right-triangle-shaped parts 904, 908, the triangular projection faces "3", "7", the right-triangle-shaped parts 912, 916 and the triangular projection face "6" with no image content discontinuity. In this way, the number of image content discontinuity boundaries resulted from packing of the projection faces can be reduced.

The proposed compact octahedron projection layouts 410, 506, 606, 706, 818, and 918 are for illustrative purposes only, and are not meant to be limitations of the present invention. In practice, an alternative compact octahedron projection layout may be obtained from applying a specific operation (e.g., face sequence adjustment, layout rotation, and/or layout mirroring) to any of the proposed compact octahedron projection layouts 410, 506, 606, 706, 818, and 918. These alternative layout designs all fall within the scope of the present invention.

A shape of each of the triangular projection faces of the rotated octahedron 304 is an equilateral triangle. Hence, at least one side of a triangular projection face (or a right-triangle-shaped part of a triangular projection face) packed in a proposed compact octahedron projection layout may be a 60-degree edge that is neither a vertical edge nor a horizontal edge. Specifically, the 60-degree edge can be observed to have a jagged shape due to the fact that pixels are required to be arranged in a matrix pattern.

Figure 10:
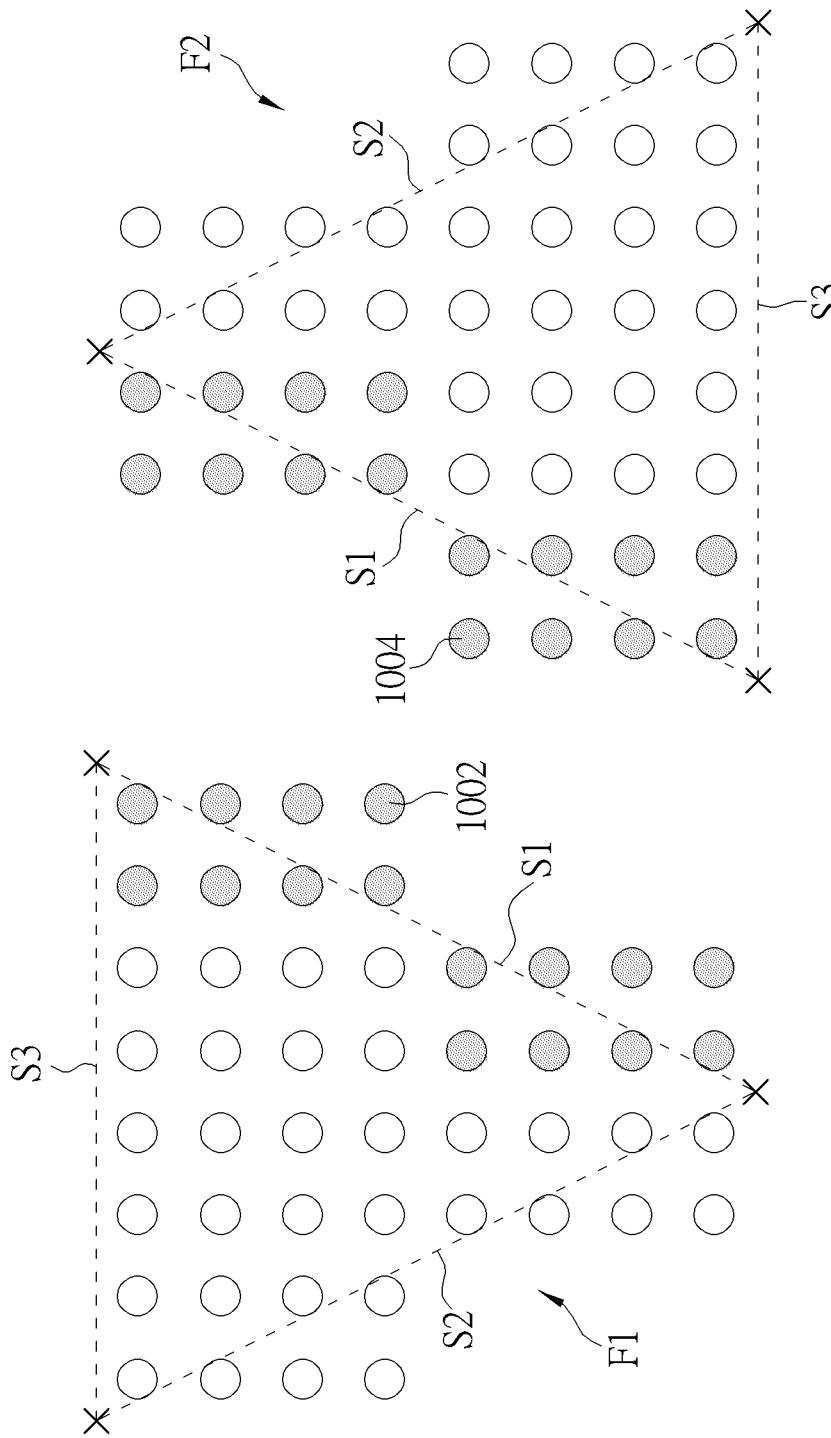
FIG. 10 is a diagram illustrating packing of two triangular projection faces according to an embodiment of the present invention.

FIG. 10 is a diagram illustrating packing of two triangular projection faces according to an embodiment of the present invention. Two triangular projection faces F1 and F2 are required to be packed in an octahedron projection layout. Each of the triangular projection faces F1 and F2 has three sides S1, S2, and S3, where the side S3 is a horizontal edge, and both of the sides S1 and S2 are 60-degree edges. In this example, the side S1 of the triangular projection face F1 should be connected to the side S1 of the triangular projection face F2 by triangular projection face packing. As shown in FIG. 10, boundary pixel samples (marked by black points) 1002 are located on the side S1 of the triangular projection face F1, and boundary pixel samples (marked by black points) 1004 are located on the side S1 of the triangular projection face F2. To achieve a compact size of an octahedron projection layout, the present invention proposes removing boundary pixel samples at a specific side of a first triangular projection face (e.g., the side S1 of one of triangular projection faces F1 and F2) before packing the first triangular projection face (e.g., one of triangular projection faces F1 and F2) and a second triangular projection face (e.g., the other of triangular projection faces F1 and F2), and packing the first triangular projection face and the second triangular projection face in the octahedron projection layout after the boundary pixel samples are removed, where the specific side of the first triangular projection face packed in the octahedron projection layout connects with a specific side of the second triangular projection face packed in the octahedron projection layout.

The aforementioned pixel sample removal technique may be used to solve the over-sampling issue encountered by packing two triangular projection faces with continuous image content. Considering a case where the image content of the triangular projection faces F1 and F2 are continuous, the pixel samples around the boundary between two connected triangular projection faces F1 and F2 are over-sampled. For example, boundary pixel samples (marked by black points) 1002 located on the side S1 of the triangular projection face F1 and the boundary pixel samples (marked by black points) 1004 located on the side S1 of the triangular projection face F2 are obtained via projection of the same 360-degree image/video content on the viewing sphere. Hence, one of them should be removed before triangular projection face packing. In a first embodiment, the boundary pixel samples 1002 are removed, such that the boundary pixel samples 1004 also serve as the boundary pixel samples of the triangular projection face F1 when the triangular projection face F1 is connected to the triangular projection face F2 by triangular projection face packing. In a second embodiment, the boundary pixel samples 1004 are removed, such that the boundary pixel samples 1002 also serve as boundary pixel samples of the triangular projection face F2 when the triangular projection face F1 is connected to the triangular projection face F2 by triangular projection face packing. After the triangular projection faces F1 and F2 are packed in the octahedron projection layout, there is a two-pixel wide image content continuity boundary between the side S1 of the triangular projection face F1 and the side S1 of the triangular projection face F2.

Figure 11:
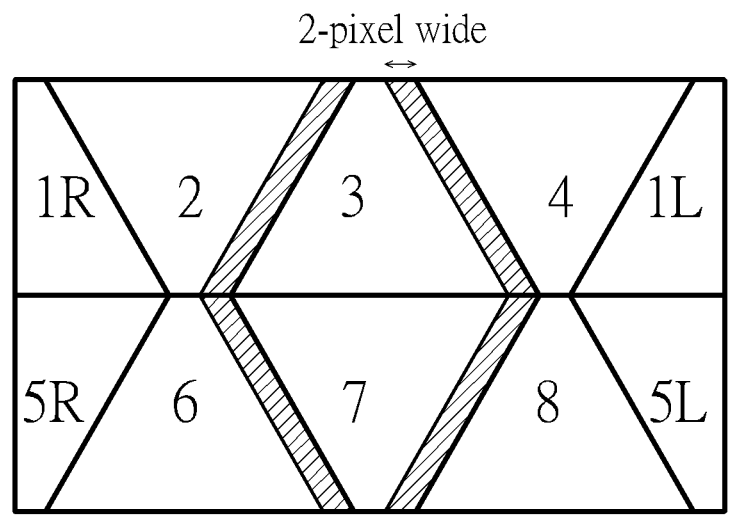
FIG. 11 is a diagram illustrating a compact octahedron projection layout with over-sampling pixel sample removal at image content continuity boundaries according an embodiment of the present invention.

The triangular projection faces F1 and F2 shown in FIG. 10 may be two of the triangular projection faces "1"-"8" that will be packed into any of the proposed compact octahedron projection layouts 410, 506, 606, 706, 818, and 918. FIG. 11 is a diagram illustrating a compact octahedron projection layout with over-sampling pixel sample removal at image content continuity boundaries according an embodiment of the present invention. In this example, the proposed over-sampling pixel sample removal is involved in generating the compact octahedron projection layout 410 shown in FIG. 4. During the process of packing the triangular projection faces "2" and "3", boundary pixel samples of the right side of the triangular projection face "2" are removed. During the process of packing the triangular projection faces "3" and "4", boundary pixel samples of the right side of the triangular projection face "3" are removed. During the process of packing the triangular projection faces "6" and "7", boundary pixel samples of the right side of the triangular projection face "6" are removed. During the process of packing the triangular projection faces "7" and "8", boundary pixel samples of the right side of the triangular projection face "7" are removed.

Figure 12:
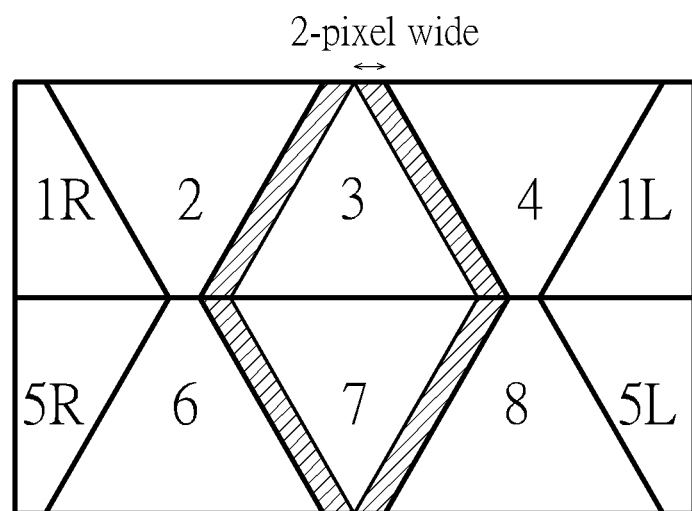
FIG. 12 is a diagram illustrating another compact octahedron projection layout with over-sampling pixel sample removal at image content continuity boundaries according an embodiment of the present invention.

FIG. 12 is a diagram illustrating another compact octahedron projection layout with over-sampling pixel sample removal at image content continuity boundaries according an embodiment of the present invention. In this example, the proposed over-sampling pixel sample removal is involved in generating the compact octahedron projection layout 410 shown in FIG. 4. During the process of packing the triangular projection faces "2" and "3", boundary pixel samples of the left side of the triangular projection face "3" are removed. During the process of packing the triangular projection faces "3" and "4", boundary pixel samples of the right side of the triangular projection face "3" are removed. During the process of packing the triangular projection faces "6" and "7", boundary pixel samples of the left side of the triangular projection face "7" are removed. During the process of packing the triangular projection faces "7" and "8", boundary pixel samples of the right side of the triangular projection face "7" are removed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
receiving a bitstream; and
decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces;
wherein a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and
wherein the triangular projection faces packed in the triangle-based projection layout further comprise a fourth triangular projection face, one side of the fourth triangular projection face connects with yet another side of the second triangular projection face, and there is an image content continuity boundary between said one side of the fourth triangular projection face and said yet another side of the second triangular projection face.

2. The video processing method of claim 1, wherein the viewing sphere is composed of a first hemisphere and a second hemisphere; the first triangular projection face, the second triangular projection face and the third triangular projection face are all derived from the first hemisphere via the triangle-based projection of the viewing sphere; and the fourth triangular projection face is derived from the second hemisphere via the triangle-based projection of the viewing sphere.

3. The video processing method of claim 1, wherein the triangular projection faces packed in the triangle-based projection layout further comprise a fifth triangular projection face, the fifth triangular projection face is split into a first right-triangle-shaped part and a second right-triangle-shaped part, the first right-triangle-shaped part has a first side being one side of the fifth triangular projection face and a second side being a first part of another side of the fifth triangular projection face, the second right-triangle-shaped part has a first side being yet another side of the fifth triangular projection face and a second side being a second part of said another side of the fifth triangular projection face, the first side of the second right-triangle-shaped part connects another side of the first triangular projection face, and the first side of the first right-triangle-shaped part connects another side of the third triangular projection face.

4. The video processing method of claim 3, wherein the triangular projection faces packed in the triangle-based projection layout further comprise a sixth triangular projection face, a seventh triangular projection face, and an eighth triangular projection face, one side of the seventh triangular projection face connects with another side of the fourth triangular projection face, one side of the eighth triangular projection face connects with yet another side of the fourth triangular projection face, there is an image content continuity boundary between said one side of the seventh triangular projection face and said another side of the fourth triangular projection face, there is an image content continuity boundary between said one side of the eighth triangular projection face and said yet another side of the fourth triangular projection face, the sixth triangular projection face is split into a third right-triangle-shaped part and a fourth right-triangle-shaped part, the third right-triangle-shaped part has a first side being one side of the sixth triangular projection face and a second side being a first part of another side of the sixth triangular projection face, the fourth right-triangle-shaped part has a first side being yet another side of the sixth triangular projection face and a second side being a second part of said another side of the sixth triangular projection face, the first side of the third right-triangle-shaped part connects with another side of the seventh triangular projection face, and the first side of the fourth right-triangle-shaped part connects with another side of the eighth triangular projection face.

5. The video processing method of claim 4, wherein the equator of the viewing sphere is mapped to the second triangular projection face, the fourth triangular projection face, the fifth triangular projection face, and the sixth triangular projection face.

6. A video processing method comprising:
receiving a bitstream; and
decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces;
wherein a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and wherein the triangular projection faces packed in the triangle-based projection layout further comprise a fourth triangular projection face, a fifth triangular projection face, and a sixth triangular projection face, another side of the third triangular projection face connects with one side of the fourth triangular projection face, another side of the fourth triangular projection face connects with one side of the fifth triangular projection face, another side of the fifth triangular projection face connects with one side of the sixth triangular projection face, there is an image content continuity boundary between said another side of the third triangular projection face and said one side of the fourth triangular projection face, there is an image content continuity boundary between said another side of the fourth triangular projection face and said one side of the fifth triangular projection face, and there is an image content continuity boundary between said another side of the fifth triangular projection face and said one side of the sixth triangular projection face.

7. The video processing method of claim 6, wherein the triangular projection faces packed in the triangle-based projection layout further comprise a seventh triangular projection face and an eighth triangular projection face, one side of the eighth triangular projection face connects with another side of the sixth triangular projection face, the seventh triangular projection face is split into a first right-triangle-shaped part and a second right-triangle-shaped part, the first right-triangle-shaped part has a first side being one side of the seventh triangular projection face and a second side being a first part of another side of the seventh triangular projection face, the second right-triangle-shaped part has a first side being yet another side of the seventh triangular projection face and a second side being a second part of said another side of the seventh triangular projection face, the first side of the second right-triangle-shaped part connects with another side of the first triangular projection face, and the first side of the first right-triangle-shaped part connects another side of the eighth triangular projection face.

8. The video processing method of claim 6, wherein the equator of the viewing sphere is mapped to the first triangular projection face, the second triangular projection face, the fourth triangular projection face, and the fifth triangular projection face.

9. The video processing method of claim 6, wherein the viewing sphere is composed of a first hemisphere and a second hemisphere; the first triangular projection face, the fifth triangular projection face and the sixth triangular projection face are all derived from the first hemisphere via the triangle-based projection of the viewing sphere; and the second triangular projection face, the third triangular projection face and the fourth triangular projection face are all derived from the second hemisphere via the triangle-based projection of the viewing sphere.

10. The video processing method of claim 6, wherein the equator of the viewing sphere is mapped to the first triangular projection face, the third triangular projection face, the fourth triangular projection face, and the sixth triangular projection face.

11. The video processing method of claim 6, wherein the viewing sphere is composed of a first hemisphere and a second hemisphere; the first triangular projection face, the second triangular projection face and the third triangular projection face are all derived from the first hemisphere via the triangle-based projection of the viewing sphere; and the fourth triangular projection face, the fifth triangular projection face and the sixth triangular projection face are all derived from the second hemisphere via the triangle-based projection of the viewing sphere.

12. The video processing method of claim 6, wherein the triangular projection faces packed in the triangle-based projection layout further comprise a seventh triangular projection face and an eighth triangular projection face, another side of the sixth triangular projection face connects with one side of the seventh triangular projection face, another side of the seventh triangular projection face connects with one side of the eighth triangular projection face, there is an image content continuity boundary between said another side of the sixth triangular projection face and said one side of the seventh triangular projection face, and there is an image content continuity boundary between said another side of the seventh triangular projection face and said one side of the eighth triangular projection face.

13. The video processing method of claim 12, wherein the second triangular projection face is split into a first right-triangle-shaped part and a second right-triangle-shaped part, the first right-triangle-shaped part has a first side being said one side of the second triangular projection face and a second side being a first part of said another side of the second triangular projection face, the second right-triangle-shaped part has a first side being yet another side of the second triangular projection face and a second side being a second part of said another side of the second triangular projection face, the third triangular projection face is split into a third right-triangle-shaped part and a fourth right-triangle-shaped part, the third right-triangle-shaped part has a first side being said another side of the third triangular projection face and a second side being a first part of said one side of the third triangular projection face, the fourth right-triangle-shaped part has a first side being yet another side of the third triangular projection face and a second side being a second part of said one side of the third triangular projection face, the sixth triangular projection face is split into a fifth right-triangle-shaped part and a sixth right-triangle-shaped part, the fifth right-triangle-shaped part has a first side being said one side of the sixth triangular projection face and a second side being a first part of said another side of the sixth triangular projection face, the sixth right-triangle-shaped part has a first side being yet another side of the sixth triangular projection face and a second side being a second part of said another side of the sixth triangular projection face, the seventh triangular projection face is split into a seventh right-triangle-shaped part and an eighth right-triangle-shaped part, the seventh right-triangle-shaped part has a first side being said another side of the seventh triangular projection face and a second side being a first part of said one side of the seventh triangular projection face, the eighth right-triangle-shaped part has a first side being yet another side of the seventh triangular projection face and a second side being a second part of said one side of the seventh triangular projection face, the first side of the second right-triangle-shaped part connects with another side of the first triangular projection face, the first side of the fourth right-triangle-shaped part connects with yet another side of the fourth triangular projection face, the first side of the sixth right-triangle-shaped part connects with yet another side of the fifth triangular projection face, and the first side of the eighth right-triangle-shaped part connects with another side of the eighth triangular projection face.

14. The video processing method of claim 12, wherein the equator of the viewing sphere is mapped to the second triangular projection face, the fourth triangular projection face, the fifth triangular projection face, and the seventh triangular projection face.

15. The video processing method of claim 12, wherein the viewing sphere is composed of a first hemisphere and a second hemisphere; the first triangular projection face, the second triangular projection face, the third triangular projection face and the fourth triangular projection face are all derived from the first hemisphere via the triangle-based projection of the viewing sphere; and the fifth triangular projection face, the sixth triangular projection face, the seventh triangular projection face and the eighth triangular projection face are all derived from the second hemisphere via the triangle-based projection of the viewing sphere.

16. A video processing method comprising:
receiving a bitstream; and
decoding, by a video decoder, the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces;
wherein there is an image content discontinuity boundary between sides of any two adjacent triangular projection faces in the triangle-based projection layout; and
wherein a shape of the triangle-based projection layout is a rectangle, the triangular projection faces packed in the triangle-based projection layout comprise a first triangular projection face, a second triangular projection face, a third triangular projection face, a fourth triangular projection face, a fifth triangular projection face, a sixth triangular projection face, a seventh triangular projection face, and an eighth triangular projection face, one side of the first triangular projection face connects with one side of the second triangular projection face, one side of the third triangular projection face connects with another side of the second triangular projection face, one side of the fourth triangular projection face connects with another side of the third triangular projection face, one side of the fifth triangular projection face connects with another side of the fourth triangular projection face, one side of the sixth triangular projection face connects with another side of the fifth triangular projection face, one side of the seventh triangular projection face connects with another side of the sixth triangular projection face, the eighth triangular projection face is split into a first right-triangle-shaped part and a second right-triangle-shaped part, the first right-triangle-shaped part has a first side being one side of the eighth triangular projection face and a second side being a first part of another side of the eighth triangular projection face, the second right-triangle-shaped part has a first side being yet another side of the eighth triangular projection face and a second side being a second part of said another side of the eighth triangular projection face, the first side of the first right-triangle-shaped part connects with another side of the seventh triangular projection face, and the first side of the second right-triangle-shaped part connects with another side of the first triangular projection face.

17. A video processing apparatus comprising:
a video decoder, arranged to receive a bitstream, and decode the bitstream to generate a decoded frame, wherein the decoded frame is a projection-based frame that has a 360-degree image/video content represented by triangular projection faces packed in a triangle-based projection layout, an omnidirectional image/video content of a viewing sphere is mapped onto the triangular projection faces via a triangle-based projection of the viewing sphere, and an equator of the viewing sphere is not mapped along any side of each of the triangular projection faces;
wherein a shape of the triangle-based projection layout is a rectangle, the triangular projection faces packed in the triangle-based projection layout comprise a first triangular projection face, a second triangular projection face and a third triangular projection face, one side of the first triangular projection face connects with one side of the second triangular projection face, one side of the third triangular projection face connects with another side of the second triangular projection face, there is an image content continuity boundary between said one side of the first triangular projection face and said one side of the second triangular projection face, and there is an image content continuity boundary between said one side of the third triangular projection face and said another side of the second triangular projection face; and
wherein the triangular projection faces packed in the triangle-based projection layout further comprise a fourth triangular projection face, one side of the fourth triangular projection face connects with yet another side of the second triangular projection face, and there is an image content continuity boundary between said one side of the fourth triangular projection face and said yet another side of the second triangular projection face.

* * * * *